United States Patent
Lee

(10) Patent No.: US 10,200,462 B2
(45) Date of Patent: Feb. 5, 2019

(54) MEMORY SYSTEM INCLUDING PLURALITY OF SERVER NODES SHARING STORAGE ARRAY AND OPERATING METHOD OF MEMORY SYSTEM

(71) Applicant: Samsung Electronics Co., Ltd., Suwon-si (KR)

(72) Inventor: Ju-pyung Lee, Incheon (KR)

(73) Assignee: SAMSUNG ELECTRONICS CO., LTD., Suwon-si Gyeonggi-do (KR)

( * ) Notice: Subject to any disclaimer, the term of this patent is extended or adjusted under 35 U.S.C. 154(b) by 66 days.

(21) Appl. No.: 15/601,171

(22) Filed: May 22, 2017

(65) Prior Publication Data
US 2018/0131758 A1 May 10, 2018

(30) Foreign Application Priority Data
Nov. 10, 2016 (KR) .................. 10-2016-0149590

(51) Int. Cl.
| | | |
|---|---|---|
| G06F 15/173 | (2006.01) | |
| H04L 29/08 | (2006.01) | |
| G06F 9/50 | (2006.01) | |
| G06F 21/80 | (2013.01) | |
| H04L 29/06 | (2006.01) | |
| H04L 12/923 | (2013.01) | |

(52) U.S. Cl.
CPC .......... *H04L 67/1012* (2013.01); *G06F 9/505* (2013.01); *G06F 21/80* (2013.01); *H04L 47/762* (2013.01); *H04L 63/0245* (2013.01); *H04L 63/10* (2013.01); *H04L 67/101* (2013.01); *H04L 67/1002* (2013.01); *H04L 67/1008* (2013.01)

(58) Field of Classification Search
USPC ........................................................ 709/226
See application file for complete search history.

(56) References Cited

U.S. PATENT DOCUMENTS

| | | | |
|---|---|---|---|
| 6,467,022 B1 | 10/2002 | Buckland et al. | |
| 6,990,667 B2 | 1/2006 | Ulrich et al. | |
| 8,271,606 B2 | 9/2012 | Jewett et al. | |
| 8,683,481 B2 | 3/2014 | Bachar et al. | |
| 9,063,655 B2 | 6/2015 | Maxwell et al. | |
| 2007/0226331 A1* | 9/2007 | Srinivasan | G06F 17/302 709/223 |
| 2007/0294319 A1* | 12/2007 | Mankad | G06F 11/1662 |
| 2015/0286429 A1 | 10/2015 | Dain et al. | |
| 2015/0378921 A1 | 12/2015 | Karippara et al. | |
| 2016/0162508 A1 | 6/2016 | Brosch | |
| 2016/0231948 A1* | 8/2016 | Gupta | G06F 3/0611 |

* cited by examiner

*Primary Examiner* — Hee Soo Kim
(74) *Attorney, Agent, or Firm* — Muir Patent Law, PLLC

(57) ABSTRACT

An operating method of a memory system including a storage array including a plurality of segments and a first server node and a second server node allocating and managing the plurality of segments includes: requesting, via the first server node, load information from the second server node before performing a memory operation; receiving, via the first server node, the load information from the second server node and comparing load information of the first server node with the load information of the second server node; performing, via the first server node, a load balancing operation, based on a comparison result; and performing, via the first server node, a segment dynamic allocation operation regarding the storage array, the segment dynamic allocation operation matching the load balancing operation.

20 Claims, 20 Drawing Sheets

US 10,200,462 B2

MEMORY SYSTEM INCLUDING PLURALITY OF SERVER NODES SHARING STORAGE ARRAY AND OPERATING METHOD OF MEMORY SYSTEM

CROSS-REFERENCE TO RELATED APPLICATION

This application claims the benefit of priority under 35 U.S.C. § 119 to Korean Patent Application No. 10-2016-0149590, filed on Nov. 10, 2016, in the Korean Intellectual Property Office, the disclosure of which is incorporated herein in its entirety by reference.

BACKGROUND

The disclosed embodiments relate to a memory system, and more particularly, to a memory system performing a segment dynamic allocation operation by sharing a storage array, and an operating method of the memory system.

In a memory system, a plurality of server nodes may share a storage array in the form of one just a bunch of disks or drives (JBOD) and may provide a storage service to the host by using the storage array. Also, the memory system may support redundant array of inexpensive disks (RAID), and thus, input and output operations regarding the storage array may be balanced, and the overall performance of the server nodes may improve.

SUMMARY

The disclosed embodiments provide a memory system for performing a segment dynamic allocation operation between server nodes, and an operating method of the memory system.

In some embodiments, the disclosure is directed to an operating method of a memory system comprising a storage array comprising a plurality of segments and a first server node and a second server node allocating and managing the plurality of segments, the method comprising: requesting, by the first server node, load information of the second server node from the second server node before performing a memory operation; receiving, by the first server node, the load information of the second server node from the second server node; comparing, by the first server node, load information of the first server node with the load information of the second server node to obtain a comparison result; performing, by the first server node, a load balancing operation, based on the comparison result; and performing, by the first server node, a segment dynamic allocation operation regarding the storage array, wherein the segment dynamic allocation operation corresponds to the load balancing operation.

In some embodiments, the disclosure is directed to an operating method of a memory system comprising a storage array comprising a plurality of segments and a first server node and a second server node allocating and managing the plurality of segments in a volume migration unit, the method comprising: requesting, by the first server node, load information of the second server unit from the second server node before performing a memory operation; receiving, by the first server node, the load information of the second server node; comparing load information of the first server node with the load information of the second server node to obtain a comparison result; performing, by the first server node, a volume migration operation, based on the comparison result; and performing, by the first server node, a segment dynamic allocation operation regarding the storage array, wherein the segment dynamic allocation operation corresponds to the volume migration operation.

In some embodiments, the disclosure is directed to an operating method of a memory system comprising a storage array having a plurality of segments and a first server node and a second server node allocating and managing the plurality of segments, the method comprising: requesting, by the first server node, load information of the second server node before performing a memory operation; receiving, from the second server node, the load information of the second server node; comparing, by the first server node, load information of the first server node with the load information of the second server node to obtain a comparison result; determining, by the first server node, if a difference between a second load indicated by the load information of the second server node and a first load indicated by the load information of the first server node is greater than a threshold value based on the comparison result; performing, by the first server node, a load balancing operation, when the difference between the second load and the first load is greater than the threshold value; and performing, by the first server node, a segment dynamic allocation operation regarding the storage array, wherein the segment dynamic allocation operation corresponds to the load balancing operation.

BRIEF DESCRIPTION OF THE DRAWINGS

The disclosed embodiments will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

It will be understood that when an element is referred to as being "connected" or "coupled" to, or "on" another element, it can be directly connected or coupled to, or on the other element or intervening elements may be present. In contrast, when an element is referred to as being "directly connected," "directly coupled," in or "directly on" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to a connection contact (i.e., touching) unless the context indicates otherwise.

Figure 1:
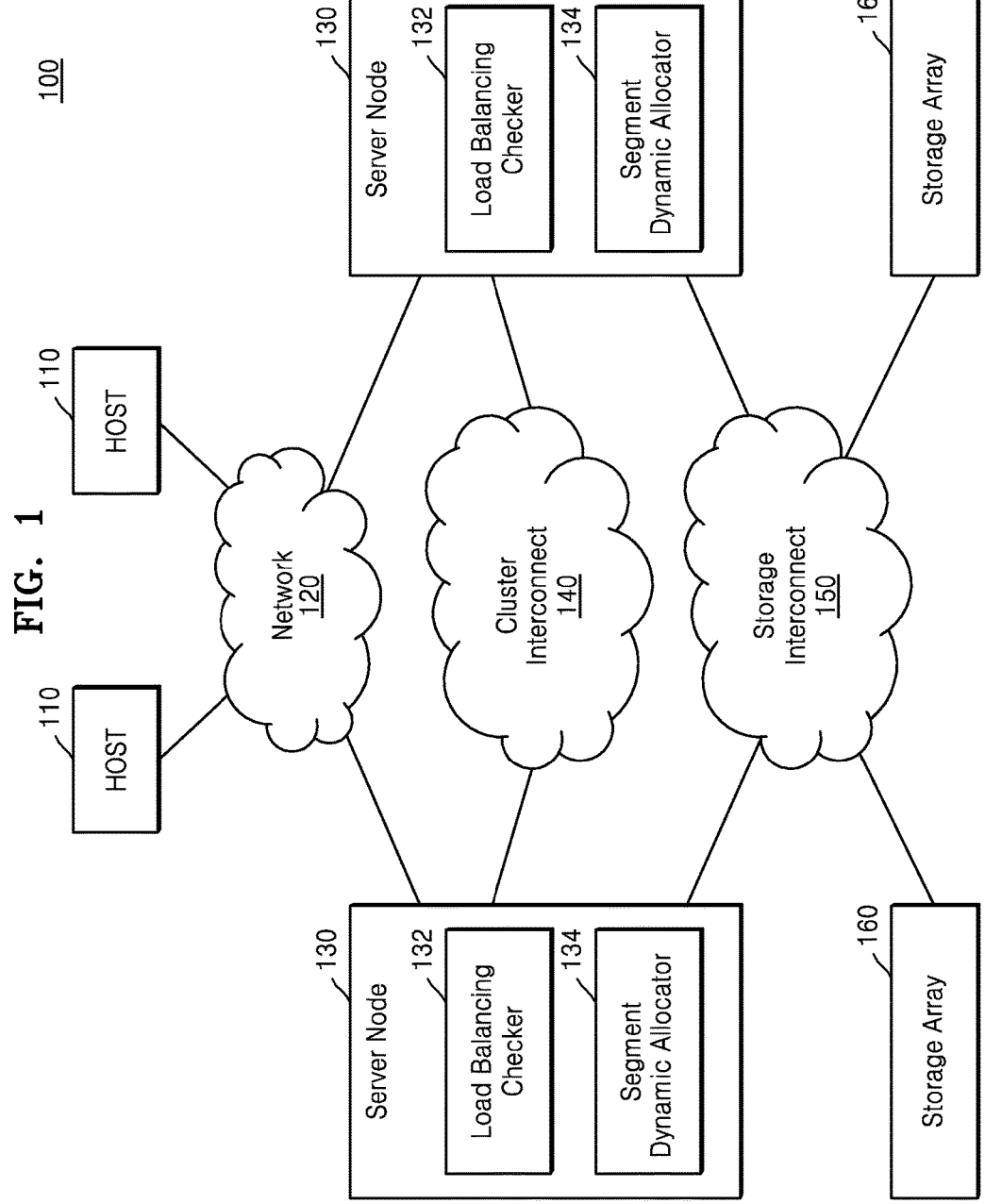
FIG. 1 is a block diagram of a connection relationship of a cluster according to an exemplary embodiment of the present disclosure.

FIG. 1 is a block diagram of a connection relationship of a cluster 100 according to an exemplary embodiment of the present disclosure.

Referring to FIG. 1, the cluster 100 may include a plurality of hosts 110, a plurality of server nodes 130, and a plurality of storage arrays 160. The plurality of server nodes 130 may be configured to perform a storage service which involves providing information stored in a storage device to a host 110. The plurality of server nodes 130 may include hardware and software for being connected to at least one host 110. For example, each of the plurality of server nodes 130, also described as servers, may include hardware configured to execute software, enabling each of the plurality of server nodes 130 to transmit/receive data and other information, including data and information to establish one or more connections, maintain the one or more connections, communicate via the one or more connections, end the one or more connections, etc. For example, each server node 130 may be a standalone computer, or a rack of rack-mount servers. Also, the plurality of server nodes 130 may be connected to at least one storage array 160 via a storage interconnect 150 and thus may provide a storage service matching a storage architecture to the host 110. In an embodiment, a configuration including the plurality of server nodes 130 and at least one storage array 160 may be defined as a memory system. The server nodes 130 of the memory system may share one storage array 160. For example, multiple server nodes 130 may be connected in common to one storage array 160. However, this is just an example, and the server nodes 130 may share each of the plurality of storage arrays 160. For example, multiple server nodes 130 may be connected in common to multiple storage arrays 160.

Each of the hosts 110 may perform communication matching a client/server model with a server node 130. In an embodiment, the host 110 may send a request for a memory operation, such as writing or reading data to/from memory, to the server node 130 via a network 120. In response to the request, the server node 130 may provide a result of a storage service to the host 110 via the network 120. The format of data packets transmitted from the host 110 to the server node 130 via the network 120 may match a file-based access protocol (for example, a network file system (NFS) protocol). For example, each of the hosts 110 may include hardware configured to execute software, enabling each of the hosts 110 to transmit/receive data and other information, including data and information to establish one or more connections, maintain the one or more connections, communicate via the one or more connections, end the one or more connections, etc.

The plurality of server nodes 130 may share a single storage array 160 including a plurality of segments. The segment may refer to a predetermined memory space unit of the storage array 160. Each of the server nodes 130 may allocate some of the plurality of segments of the storage array 160 as their segments and perform the memory operation requested from the host 110. For example, a first server node 130 may allocate a first set of plurality of segments for itself, a second server node 130 may allocate a second set of plurality of segments for itself, a third server node 130 may allocate a third set of plurality of segments for itself, etc., where the segments in each of the first, second, and third sets of segments are different from one another.

According to an exemplary embodiment, the server node 130 may include a load balancing checker 132 and a segment dynamic allocator 134. The server nodes 130 may be connected to each other via a cluster interconnect 140 and thus may mutually periodically transmit and receive pieces of load information necessary for checking load balancing. Also, the sever nodes 130 may mutually periodically transmit and receive pieces of segment allocating information necessary for dynamically allocating segments via the cluster interconnect 140. For example, each of the server nodes 130 may transmit to, and receive from other server nodes 130 load information and segment allocating information via the cluster interconnect 140.

The load balancing checker 132 of a first server node 130 may check load degrees regarding processes of other server nodes 130 which are being processed, by using load information received from the other server nodes 130, and may perform a load balancing operation in which a memory operation (for example, a foreground operation) request received by the first server node 130 from the host 110 is distributed so that the other server nodes 130 may perform the memory operation. Also, the load balancing checker 132 of the first server node 130 may perform a load balancing operation in which a memory operation (for example, a background operation) having nothing to do with a request of the host 110 is distributed so that the other server nodes 130 may perform the memory operation. The segment dynamic allocator 134 of the first server node 130 may perform a segment dynamic allocation operation corresponding to a load balancing operation of the load balancing checker 132. For example, the segment dynamic allocator 134 may perform a dynamic allocation operation and change segment allocating information indicating segments of the storage array 160 allocated to the server node 130, may provide changed segment allocating information to the other server nodes 130, and may request a segment dynamic allocation operation regarding the other server nodes 130. The segment dynamic allocators 134 included in the other sever nodes 130 may perform a segment dynamic allocation operation based on segment allocating information changed in response to a dynamic allocation operation request. Based on respective pieces of segment allocating information changed by the segment dynamic allocation operation, the server nodes 130 may each perform a foreground operation due to a request received from the host 110 or a background operation.

Through such a segment dynamic allocation operation of the memory system including the server nodes 130 and at least one storage array 160, input and output performance of the memory system may be improved, and a storage service result may be provided to the host 110 more swiftly.

Figure 2:
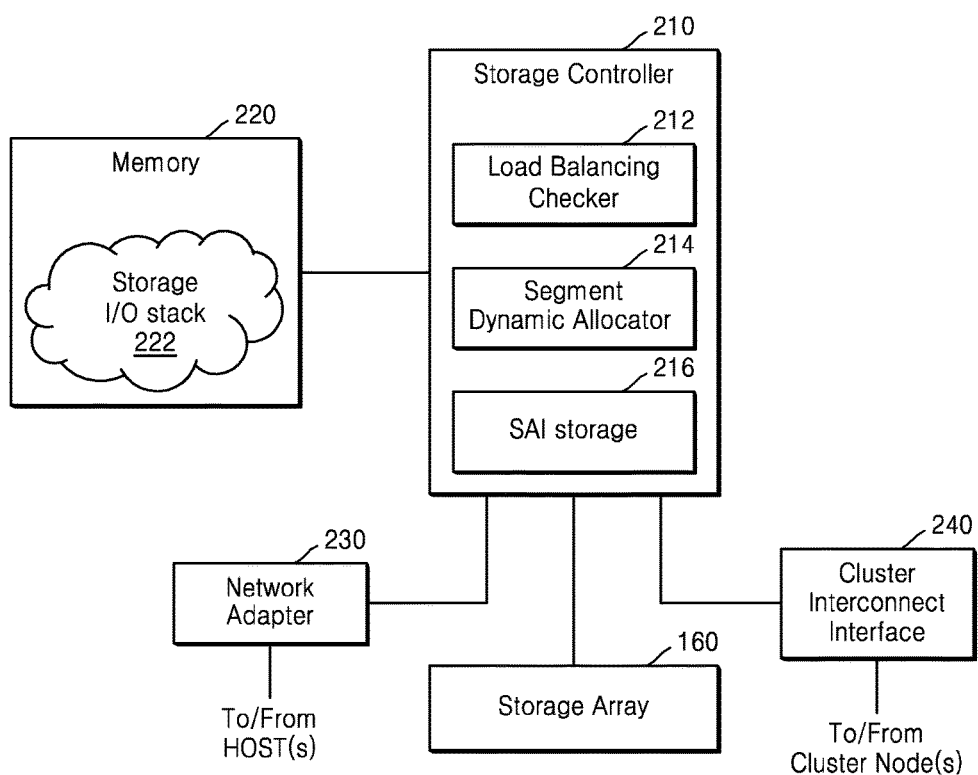
FIG. 2 is a block diagram of a server node according to an exemplary embodiment of the present disclosure.

FIG. 2 is a block diagram of a server node 200 according to an exemplary embodiment of the present disclosure.

Referring to FIG. 2, the server node 200 may include a storage controller 210, a memory 220, a network adapter 230, and a cluster interconnect interface 240. The memory 220 may be connected to the storage controller 210 via a memory bus, and may store a storage input/output (I/O) stack 222, and information regarding a data structure about the storage array 160. The storage I/O stack 222 may be a software program, and may be configured to read/write/store information in one or more hardware locations.

The network adapter 230 may include one or more ports connected to a host HOST. The host HOST may be host 110. Also, the network adapter 230 may include an electric signaling circuit for establishing and maintaining communication across a network (e.g., network 120 of FIG. 1) between the host HOST and the server node 200. The network adapter 230 may receive a logic address, a memory operation request, data, and the like from the host HOST and provide the logic address, the memory operation request, the data, and the like to the storage controller 210.

The cluster interconnect interface 240 may include one or more ports connected to other server nodes within one cluster. For example, a single cluster may include multiple server nodes 200, and the one or more ports of the cluster interconnect interface 240 of each individual server node 200 may communicatively couple the server nodes 200 with one another. Via the cluster interconnect interface 240, the storage controller 210 may transmit load information, a request related to a load balancing operation, segment allocating information, a segment dynamic allocation operation request, and the like of the server node 200 to other server nodes, and may receive load information, a request related to a load balancing operation, segment allocating information, a segment dynamic allocation operation request, and the like of the other server nodes from the other server nodes.

The storage controller 210 may be include hardware (e.g., circuitry) configured to execute a software program, such as the storage I/O stack 222 stored in the memory 220, and may manage a data structure. Also, the storage controller 210 may include a load balancing checker 212, a segment dynamic allocator 214, and a segment allocating information (SAI) storage 216. The storage controller 210 may perform a memory operation by using the storage array 160 connected to the storage controller 210. The storage array 160 may be communicatively coupled to the storage controller 210, such that data and instructions can be transmitted to and received from the storage array 160 and/or the storage controller 210. In an embodiment, the load balancing checker 212 may check load balancing between other server nodes 200 and its own server node 200 to perform a memory operation. When, as a result of checking the load balancing, it is determined that a difference in load degrees between the server node 200 and the other server nodes is equal to or greater than a threshold value, the load balancing checker 212 may perform a load balancing operation so that, by distributing memory operations that are to be performed by the server node 200 to at least one of the other server nodes, the at least one of the other server nodes is allowed to perform the memory operation instead. The threshold value may be a predetermined value, and may be stored in a memory of the server node 200. In some embodiments, the threshold value may represent a ratio of the difference between the compared load degrees. For example, if the threshold value is 2:1, when the load balancing checker 212 determines that the load degree of the server node 200 is greater than two times that of the compared load degree, the load balancing checker 212 may perform a load balancing operation. However, this is just an example embodiment, and thus, the present disclosure is not limited thereto. In some embodiments, the load balancing checker 212 may perform a load balancing operation so that, by distributing memory operations that are to be performed by the other server nodes 200 to the server node 200, the server node 200 is allowed to perform the memory operations instead. For example, when the load balancing checker 212 of a first server node 200 performs load balancing operations, the result may be that the first server node 200 offloads memory operations to other server nodes 200 or that memory operations of the other server nodes are offloaded by the other server nodes to be performed by the first server node 200.

The segment dynamic allocator 214 may perform a segment dynamic allocation operation corresponding to a load balancing operation. For example, when it is determined that a memory operation corresponding to an n-th segment allocated to the server node 200 is to be performed by another server node instead, the segment dynamic allocator 214 may change segment allocating information stored in the SAI storage 216 and disable allocation of the n-th segment for the server node 200 and may request allocation of the n-th segment to the other server node.

As described above, the server node 200 may perform a memory operation based on a segment dynamic allocation operation according to a load degree of each server node and thus may provide an efficient storage service to the host HOST.

Figure 3A:
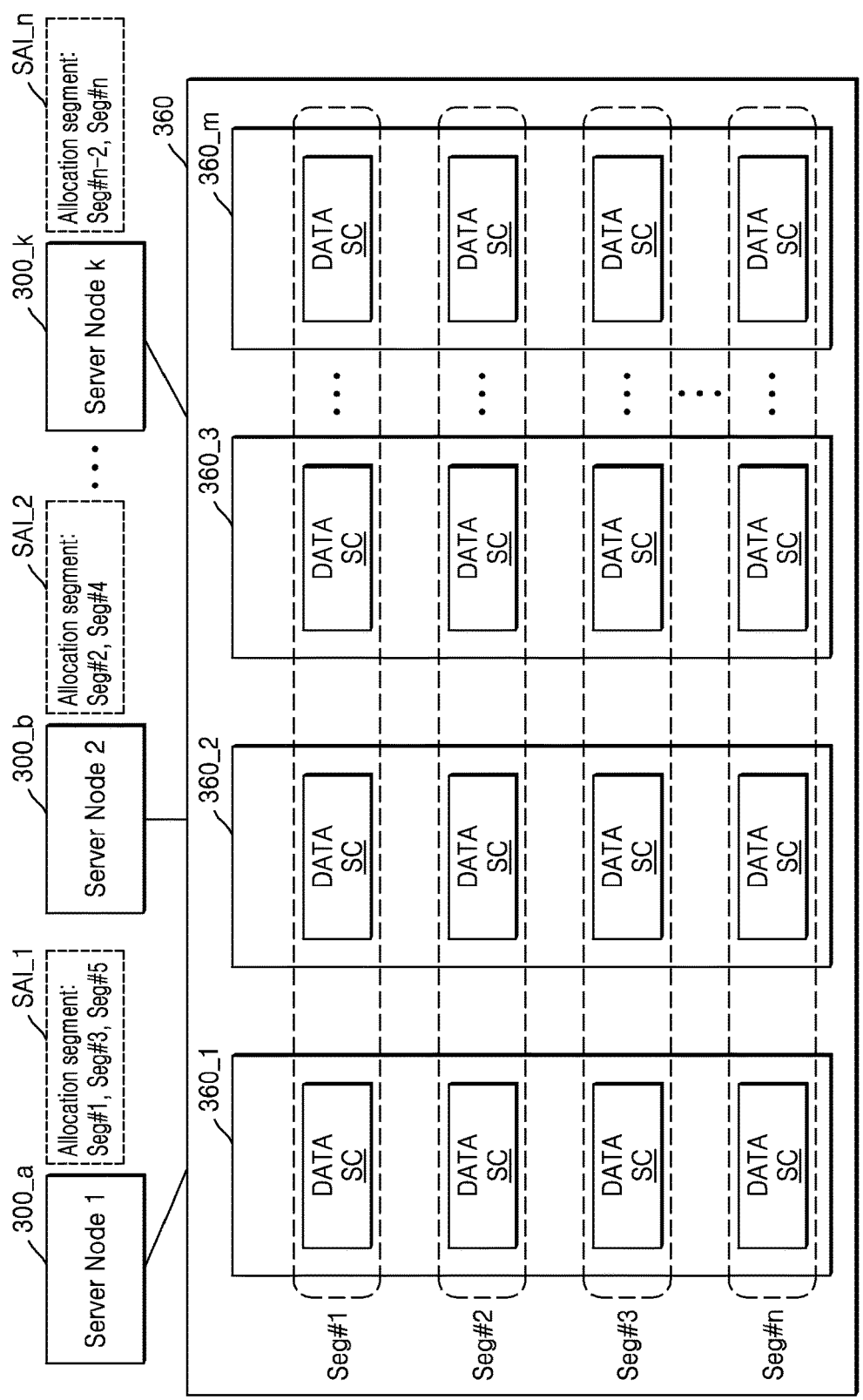
FIGS. 3A and 3B are each a diagram for describing a plurality of server nodes sharing a storage array, according to an exemplary embodiment of the present disclosure.
Figure 3B:
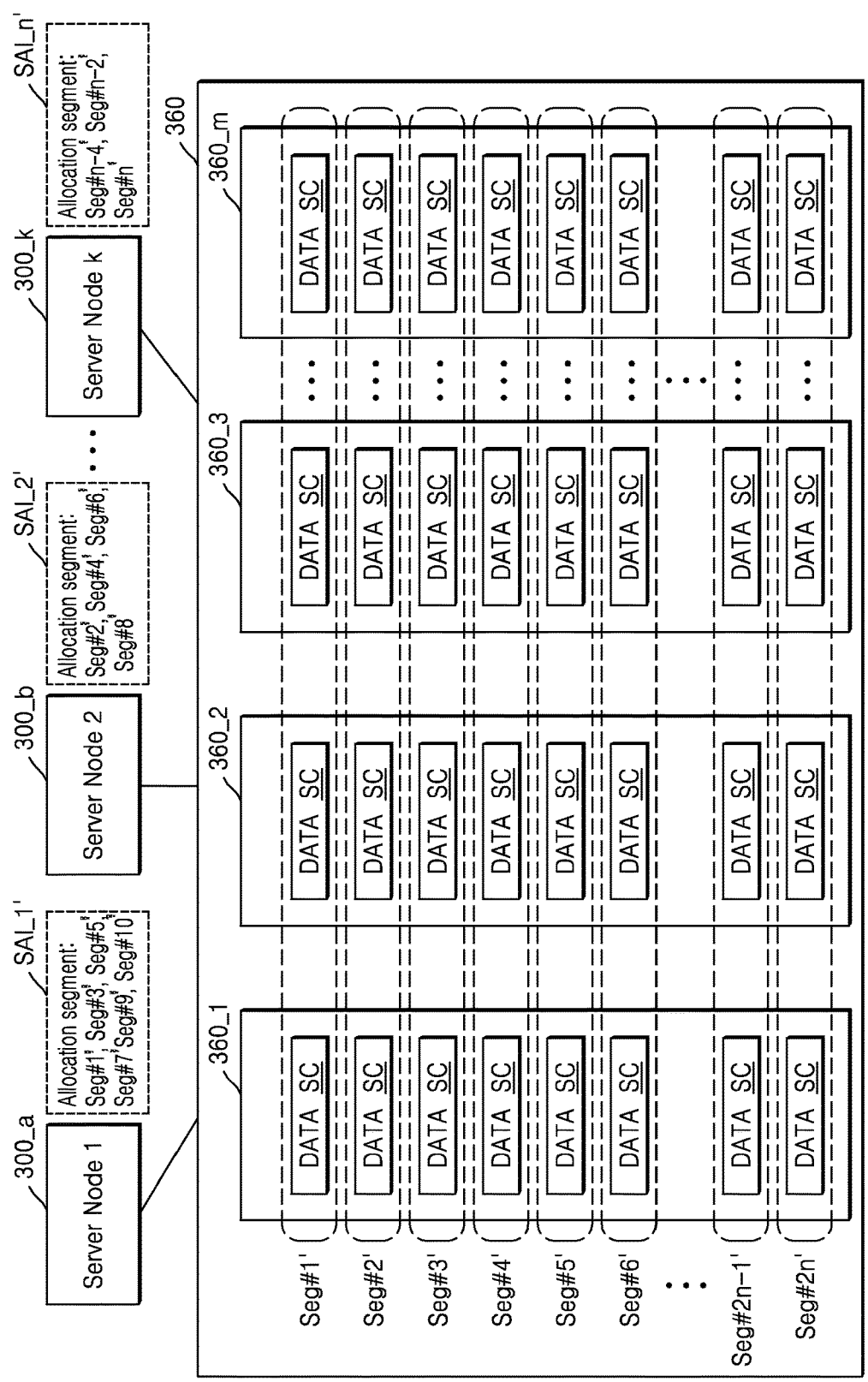

FIGS. 3A and 3B are each a diagram for describing a plurality of server nodes 300_a to 300_k (e.g., Server Node 1 through Server Node k) sharing a storage array 360, according to an embodiment of the present disclosure.

Referring to FIG. 3A, the plurality of server nodes 300_a to 300_k may share at least one storage array 360 via a storage interconnector (not illustrated in FIG. 3A). The storage array 360 may include a plurality of memory devices 360_1 to 360_m. The storage array 360 may be a just a bunch of disks or drives (JBOD), and each of the memory devices 360_1 to 360_m may be implemented as a solid state drive (SSD). However, this is just an example embodiment, and the memory devices 360_1 to 360_m may be implemented as non-volatile memory devices. The plurality of server nodes 300_a to 300_k may perform a memory operation by sharing the storage array 360 segment-by-segment. For example, the storage array 360 may include a plurality of segments Seg#1 to Seg#n, and the server nodes 300_a to 300_k may allocate different segments to themselves. In an example embodiment, the memory devices 360_1 to 360_m may include a plurality of segment chunks SC, and each segment chunk SC may include a plurality of pages where data DATA is stored. One segment chunk SC of each of the memory devices 360_1 to 360_m may be grouped together and be defined as a segment.

In detail, a first server node 300_a may allocate to itself a first segment Seg#1, a third segment Seg#3, and a fifth segment Seg#5, and may store corresponding segment allocating information SAI_1. A second server node 300_b may allocate a second segment Seg#2 and a fourth segment Seg#4 to itself and may store corresponding segment allocating information SAI_2. A k-th server node 300_k may allocate an (n−2)th segment Seg#n−2 and an n-th segment Seg#n to itself and may store corresponding segment allocating information SAI_n. Each of the first server node 300_a through k-th server node 300_k may store the corresponding segment allocating information SAI_1 to SAI_n in an SAI storage of the respective first server node 300_a through k-th server node 300_k.

For example, the first server node 300_a may perform a memory operation by using the first segment Seg#1, the third segment Seg#3, and the fifth segment Seg#5. The above segment allocation regarding the server nodes 300_a to 300_k may be dynamically changed according to load degrees of the respective server nodes 300_a to 300_k, and this will be described later in detail.

Referring to FIG. 3B, compared to FIG. 3A, a plurality of server nodes 300_a to 300_k may share a storage array 360 in which a size of a segment chunk SC is smaller. In an embodiment, the plurality of server nodes 300_a to 300_k may change a size of a segment chunk SC according to an operation mode. For example, the plurality of server nodes 300_a to 300_k may set the size of a segment chunk SC as a first size in a first operation mode, and may set the size of a segment chunk SC as a second size smaller than the first size in a second operation mode. The operation mode of the plurality of server nodes 300_a to 300_k may be set by a host or may be set to match a memory operation environment by taking into account factors such as, for example, the number of memory requests per unit time that the plurality of server nodes 300_a to 300_k receives from the host or a size of data received from the host. In some embodiments, when the size of the segment chunks SC is smaller, the number of segment chunks SC may be larger. Conversely, when the size of the segment chunks SC is larger, the number of segment chunks SC may be smaller.

For example, the storage array 360 of FIG. 3B may include a plurality of segments Seg#1' to Seg#2n' that outnumber those shown in FIG. 3A. For example, the number of segments Seg#1' to Seg#2n' of the storage array 360 of FIG. 3A may be greater than the number of segments Seg#1 to Seg#n of the storage array 360 of FIG. 3B. Also, a first server node 300_a may allocate to itself a first segment Seg#1', a third segment Seg#3', a fifth segment Seg#5', a seventh segment Seg#7', a ninth segment Seg#9', and a tenth segment Seg#10' and may store corresponding segment allocating information SAI_1'. A second server node 300_b may allocate to itself a second segment Seg#2', a fourth segment Seg#4', a sixth segment Seg#6', and an eighth segment Seg#8' and may store corresponding segment allocating information SAI_2'. A k-th server node 300_k may allocate an (n−4)th segment Seg#n−4', an (n−2)th segment Seg#n−2', and an n-th segment Seg#n' to itself and may store corresponding segment allocating information SAI_n'.

As described above, the plurality of server nodes 300_a to 300_k may change the size of segment chunks SC, and may perform an efficient memory operation by allocating segments of the storage array 360 to themselves so as to correspond to the memory operation environment.

Figure 4A:
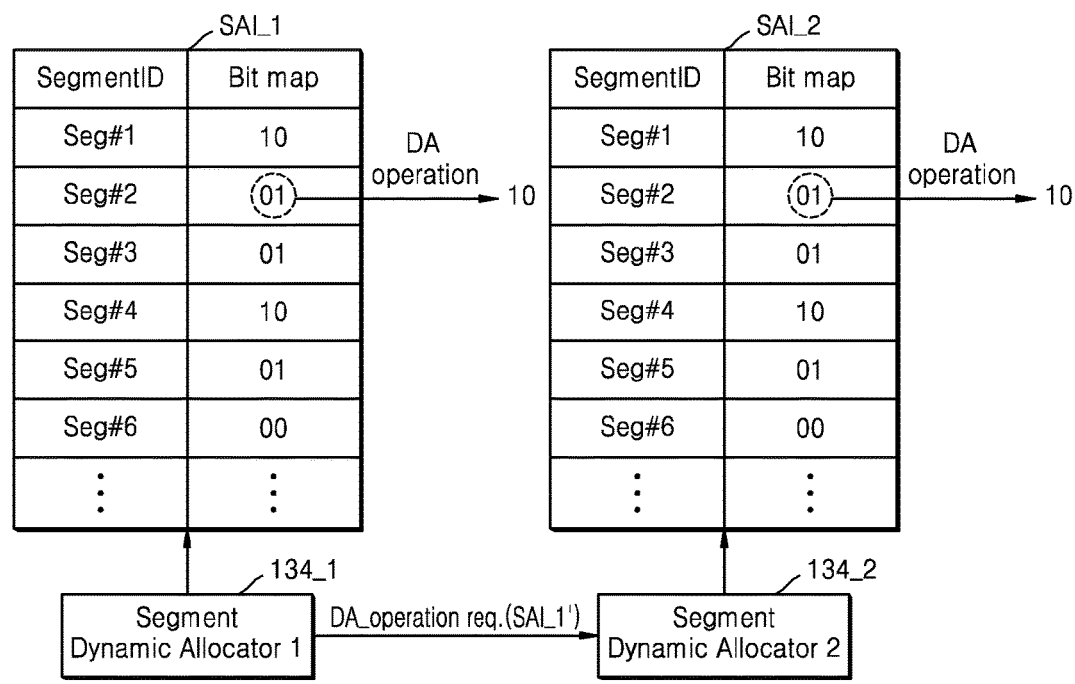
FIGS. 4A and 4B are diagrams for describing exemplary operations of a segment dynamic allocator and a load balancing checker of FIG. 2.
Figure 4B:
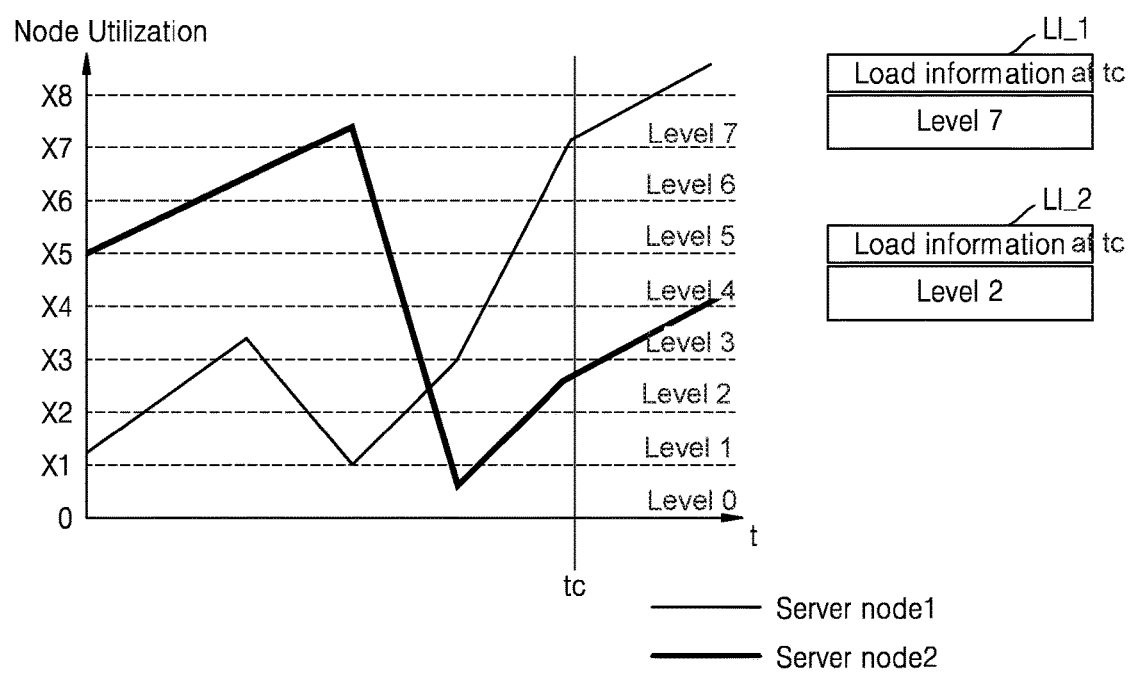

FIGS. 4A and 4B are diagrams for describing operations of the segment dynamic allocator and the load balancing checker of FIG. 2.

Referring to FIG. 4A, a first segment dynamic allocator 134_1 of a first server node may manage first segment allocating information SAI_1 and dynamically allocate segments of a storage array to the first server node. A second segment dynamic allocator 134_2 of a second server node may manage second segment allocating information SAI_2 and dynamically allocate segments of the storage array to the second server node.

In an embodiment, the first segment allocating information SAI_1 and the second segment allocating information SAI_2 may each include a plurality of segment IDs, as shown in the SegmentID column, and a bit map corresponding to each of the segment IDs. The bit map may be bit data indicating which server node a segment is allocated to. As shown in FIG. 4A, for example, bit map '01' may indicate a segment allocated to the first sever node, bit map '10' may indicate a segment allocated to the second server node, and bit map '00' may refer to a segment that is not allocated to any server node. A number of bits of the bit map may vary according to the number of server nodes included in a memory system. For example, when the number of server nodes included in the memory system is equal to or greater than 4 and smaller than or equal to 7, the bit map may be implemented as 3 bit data.

The first segment dynamic allocator 134_1 may perform a segment dynamic allocation operation DA_operation in which a second segment Seg#2 is allocated to the second server node so as to match a load balancing operation performed in the first server node. The first segment dynamic allocator 134_1 may perform the segment allocation operation DA_operation by changing a bit map corresponding to the second segment Seg#2 from '01' to '10' in the first segment allocating information SAI_1. Also, the first segment dynamic allocator 134_1 may provide a segment dynamic allocation operation request DA_operation Req. along with changed first segment allocating information SAI_1' to the second segment dynamic allocator 134_2. In response to the segment dynamic allocation operation request DA_operation Req., the second segment dynamic allocator 134_2 may change the second segment allocating information SAI_2.

Thus, the second segment Seg#2 is dynamically allocated to the second server node so that instead of the first server node, the second server node may perform a memory operation regarding the second segment Seg#2.

As shown in FIG. 4B, a first load balancing checker included in a first server node Server node1 may manage first load information LI_1 of the first server node Server node1. A second load balancing checker included in a second server node Server node2 may manage second load information LI_2 of the second server node Server node2. The graph of FIG. 4B shows an example of node utilization of the first server node Server node1 and the second server node Server node2 according to lapse of time. For example, the graph of FIG. 4B illustrates a change in the node utilization values for each of the first server node Server node1 and the second server node Server node2 over time t. The node utilization may be an indicator showing a degree to which a central processing unit (CPU) or memory is utilized to process a process of each of the server nodes Server node1 and Server node2. The node utilization may correspond to the load degree.

The load balancing checker may detect node utilization of each of the server nodes Server node1 and Server node2, convert the node utilizations into a predetermined common level unit, and generate the load information LI_1 and LI_2. For example, at a time tc, the first load balancing checker and the second load balancing checker may respectively generate pieces of load information regarding the respective server nodes Server node1 and Server node2. The first server node Server node1 may generate the first load information LI_1 by converting a detected node utilization of the first server node Server node1 into an eighth level Level 7 at which node utilization at the time tc corresponds to a range of X7 to X8. Also, the second server node Server node2 may generate the second load information LI_2 by converting a detected node utilization of the second server node Server node2 into a third level Level 2 at which node utilization at the time tc corresponds to a range of X2 to X3.

The first load balancing checker and the second load balancing checker may transmit and receive the respective pieces of load information LI_1 and LI_2 to and from each other via the cluster interconnect 140 of FIG. 1. In an embodiment, the first load balancing checker may receive the second load information LI_2 from the second load balancing checker, compare the second load information LI_2 with the first load information LI_1 stored in the first load balancing checker, and perform a load balancing operation based on a comparison result. The first load balancing checker may perform the load balancing operation when a difference between the first load information LI_1 and the second load information LI_2 is greater than a threshold value. Also, the first load balancing checker may perform the load balancing operation based on the difference between the first load information LI_1 and the second load information LI_2. For example, as the difference between the first load information LI_1 and the second load information LI_2 increases, the first load balancing checker may increase a memory operation amount distributed to the second server node Server node2 from the first server node Server node1. By distributing a greater amount of memory operations to the second server node Server node2, the difference between the first load information LI_1 and the second load information LI_2 may decrease, and the first load information LI_1 and the second load information LI_2 may be closer in value.

Although FIGS. 4A and 4B have been described with respect to an embodiment in which a memory system includes two server nodes, in order to illustrate the spirit of the present disclosure by example, the present disclosure is not limited thereto; the disclosure described with reference to FIGS. 4A and 4B may be applied to a memory system including a plurality of server nodes, as well.

Figure 5:
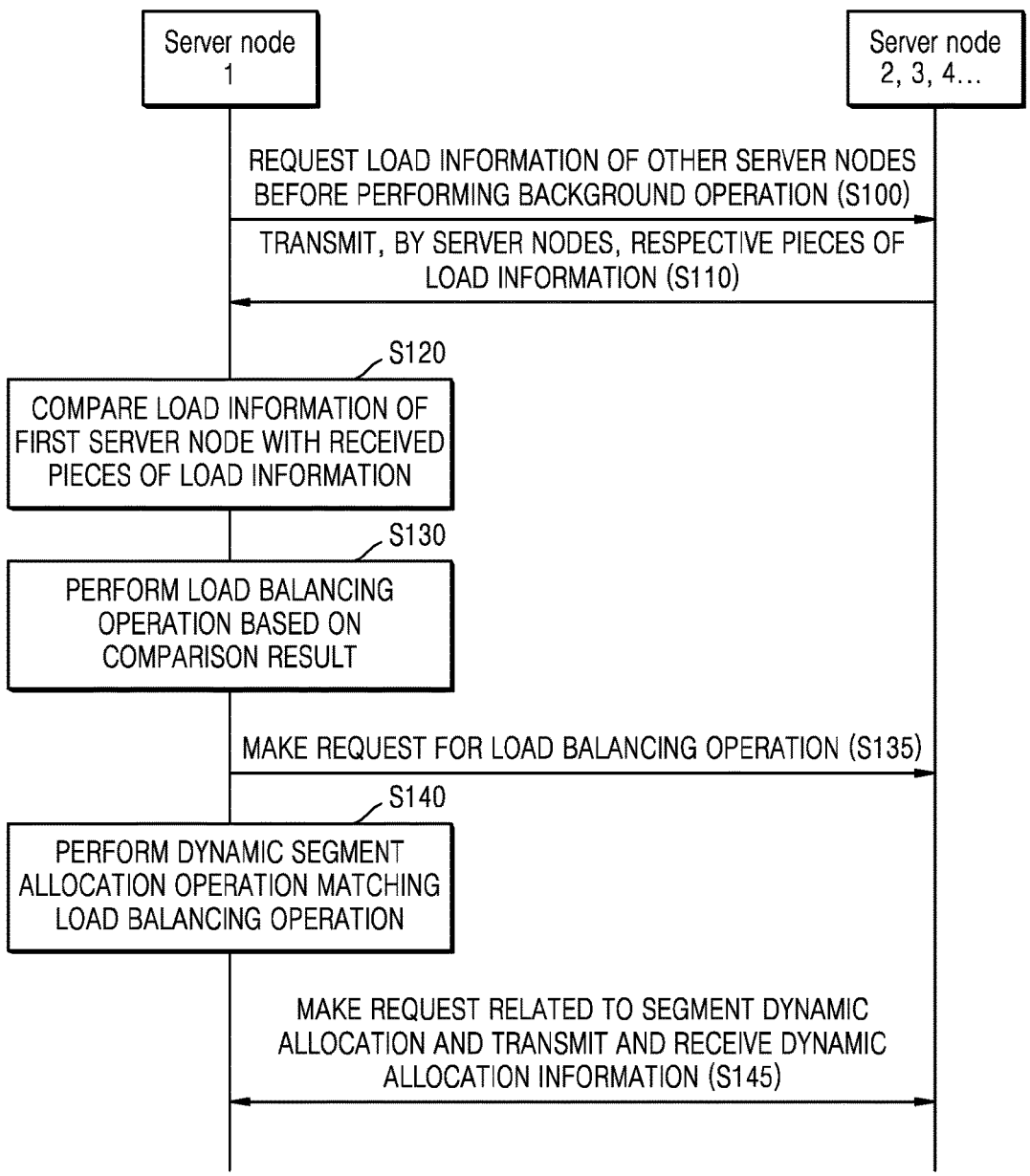
FIG. 5 is a flowchart of an operating method of a memory system, according to an exemplary embodiment of the present disclosure.

FIG. 5 is a flowchart of an operating method of a memory system, according to an example embodiment of the present disclosure.

Referring to FIG. 5, in operation S100, a first server node Server node1 may request load information of other server nodes Server node2, 3, 4, . . . by sending a load information request to the other server nodes Server node2, 3, 4, . . . before the first server node Server node1 performs a background operation. In response to the load information request, in operation S110, the other server nodes Server node2, 3, 4, . . . may transmit respective pieces of load information to the first server node Server node1. In operation S120, the first server node Server node1 may compare load information of the first server node Server node1 with received pieces of load information, which are received from the other server nodes Server node2, 3, 4, . . . . In some embodiments, the first server node Server node1 may individually compare load information of the first server node Server node1 with the load information received from the other server nodes Server node2, 3, 4, . . . (e.g., compare load information of the first server node Server node1 with load information of Server node2, compare load information of the first server node Server node1 with load information of Server node3, etc.). In operation S130, the first server node Server node1 may perform a load balancing operation based on a comparison result. For example, when a difference between the load information of the first server node Server node1 and load information of the second server node Server node2 is greater than a threshold value, the load balancing operation may be performed so that, by distributing a portion of a memory operation that is going to be performed by the first server node Server node1 to the second server node Server node2, the other server node Server node2 may instead perform that portion of the memory operation. Accordingly, when the first server node Server node1 performs the load balancing operation, the operation S130 may include operation S135 in which a request related to the load balancing operation is provided to at least one of the other server nodes Server node2, 3, 4, . . . . For example, if the load balancing operation determines to distribute a portion of the memory operation to the second server node Server node2, the first server node Server node1 may provide a request regarding the memory operation to be distributed to the second server node Server node2 to the second sever node Server node2.

In operation S140, the first server node Server node1 may perform a segment dynamic allocation operation matching the load balancing operation. The segment dynamic allocation operation may correspond to the load balancing operation. For example, the first server node Server node1 may change segment allocating information to allocate segments connected with a memory operation distributed to the other server nodes Server node2, 3, 4, . . . as a result of the load balancing operation to the other server nodes Server node2, 3, 4, . . . or to the first server node Server node1. Accordingly, the operation S140 may include operation S145 in which a request related to the segment dynamic allocation operation and related information are transmitted and received between the first server node Server node1 and the other server nodes Server node2, 3, 4 . . . .

Figure 6:
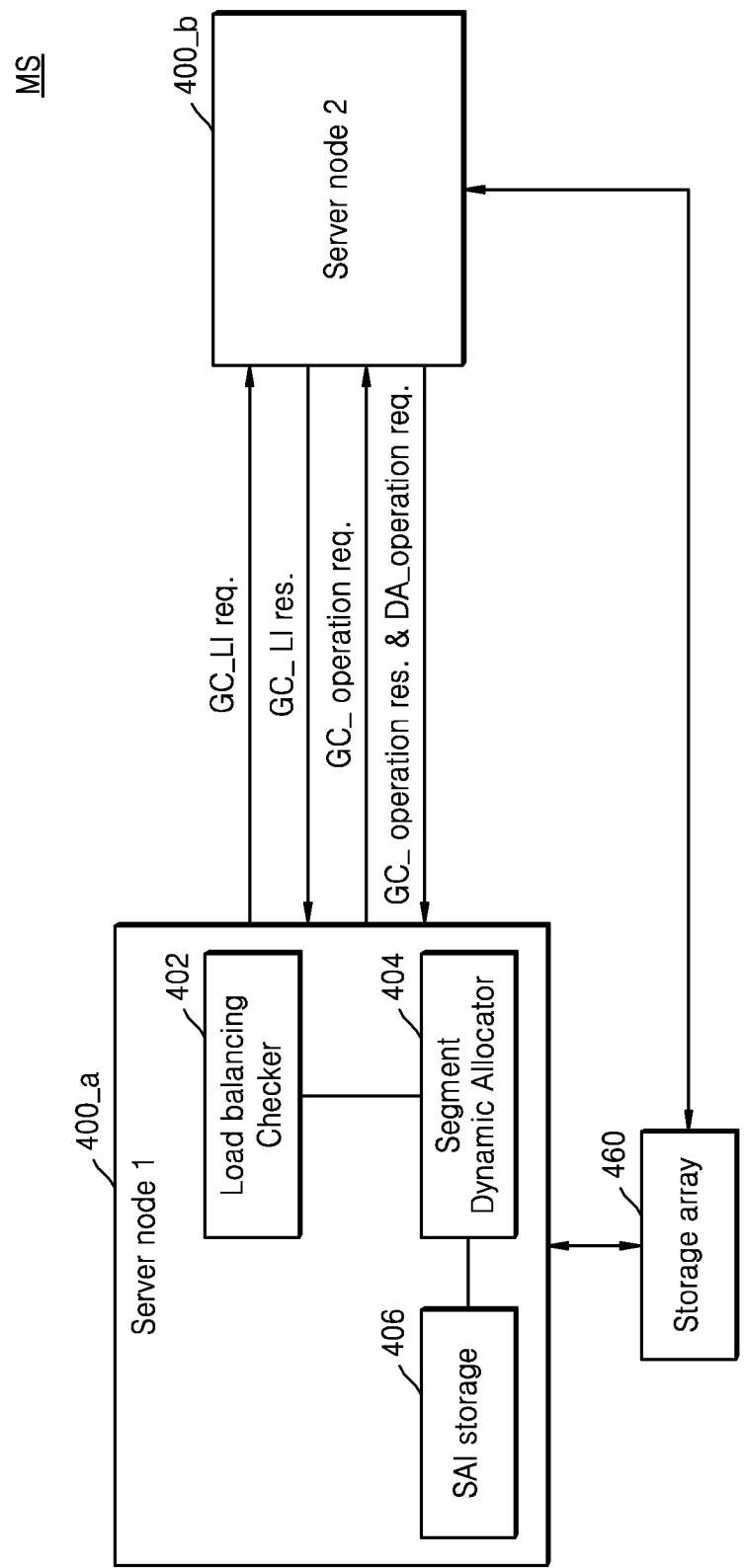
FIG. 6 is a block diagram of an operating method of a memory system in times of performing a garbage collection operation according to an exemplary embodiment of the present disclosure.

FIG. 6 is a block diagram of an operating method of a memory system MS performing a garbage collection operation according to an exemplary embodiment of the present disclosure.

Referring to FIG. 6, the memory system MS may include a first server node 400_a, a second sever node 400_b, and a storage array 460. The first server node 400_a may include a load balancing checker 402, a segment dynamic allocator 404, and an SAI storage 406. Before the first server node 400_a performs the garbage collection operation as a part of a background operation, the load balancing checker 402 may provide a garbage collection (GC) load information request signal GC_LI req. to the second server node 400_b, requesting GC load information from the second server node 400_b. The GC load information may include information about at least one of garbage collection costs regarding at least one segment allocated to the second server node 400_b and CPU/memory utilization regarding the second server node 400_b. Furthermore, the GC load information may correspond to information generated based on the garbage collection costs regarding at least one segment allocated to the second server node 400_b and the CPU/memory utilization regarding the second server node 400_b. The load balancing checker 402 may receive a GC load information response signal GC_LI res. including the GC load information from the second server node 400_b. Although not illustrated, the GC load information request signal GC_LI req. sent from the load balancing checker 402 of the first server node 400_a may be received by a load balancing checker of the second server node 400_b, and the GC load information response signal GC_LI res. may be transmitted to the load balancing checker 402 of the first server node 400_a by the load balancing checker of the second server node 400_b.

The load balancing checker 402 may compare GC load information of the first server node 400_a with GC load information of the second server node 400_b, and may perform a load balancing operation based on a comparison result. For example, the load balancing checker 402 may compare garbage collection costs regarding a segment allocated to the first server node 400_a with garbage collection costs regarding a segment allocated to the second server node 400_b, and when a difference therebetween is greater than a threshold value, the load balancing checker 402 may allow the second server node 400_b instead of the first server node 400_a to perform the garbage collection operation. Also, the load balancing checker 402 may compare CPU/memory utilization of the first server node 400_a with CPU/memory utilization of the second server node 400_b, and when a difference therebetween is greater than a threshold value, the load balancing checker 402 may allow the second server node 400_b instead of the first server node 400_a to perform the garbage collection operation. When the load balancing checker 402 determines to allow the second server node 400_b to perform the garbage collection operation, the load balancing checker 402 may provide a GC operation request signal GC_operation req. to the second server node 400_b. As a result of performing the GC operation, the second server node 400_b may generate a free segment, and may provide a GC operation completion signal GC_operation res. and a segment dynamic allocation operation request DA_operation req. for allocating the generated free segment to the first server node 400_a to the segment dynamic allocator 404. In response to the segment dynamic allocation operation request DA_operation req., the segment dynamic allocator 404 may allocate the free segment to the first server node 400_a by changing segment allocating information of the first server node 400_a.

Figure 7A:
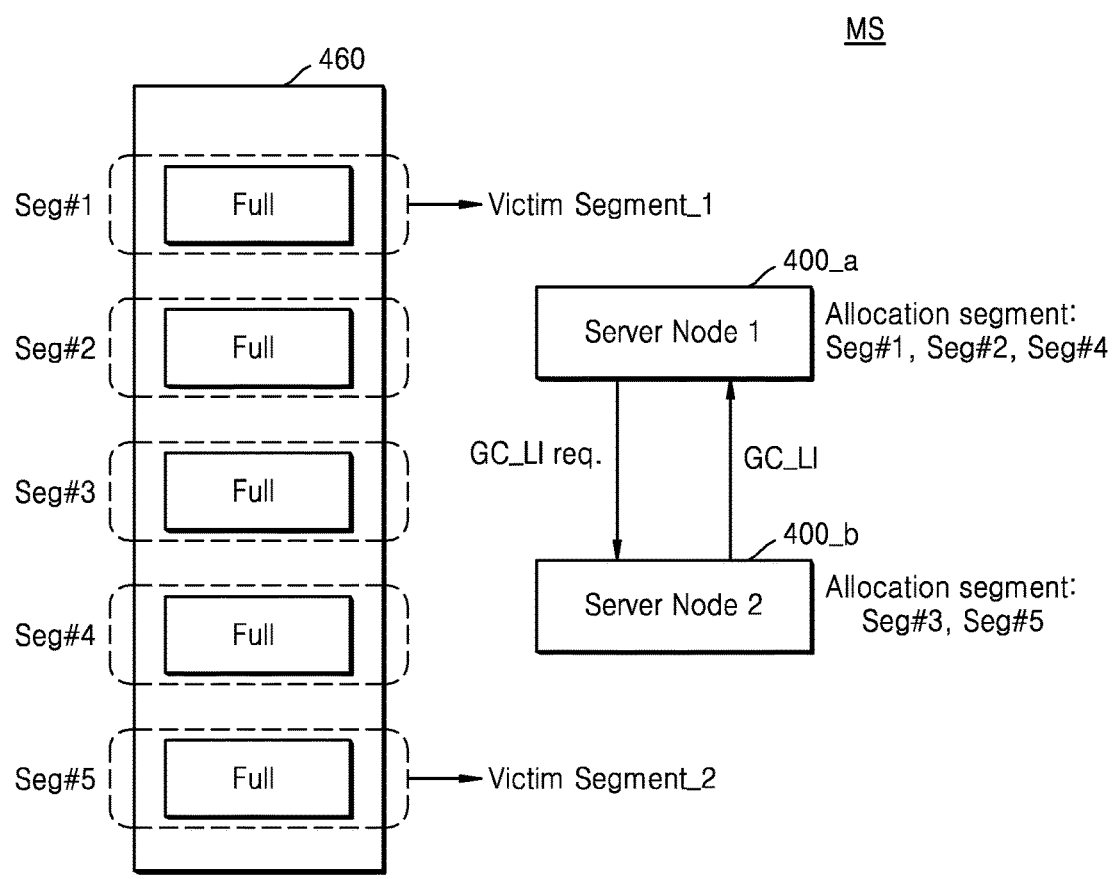
FIGS. 7A, 7B, and 8 are diagrams for describing examples of an operation of a memory system in times of performing a garbage collection operation according to various exemplary embodiments of the present disclosure.
Figure 7B:
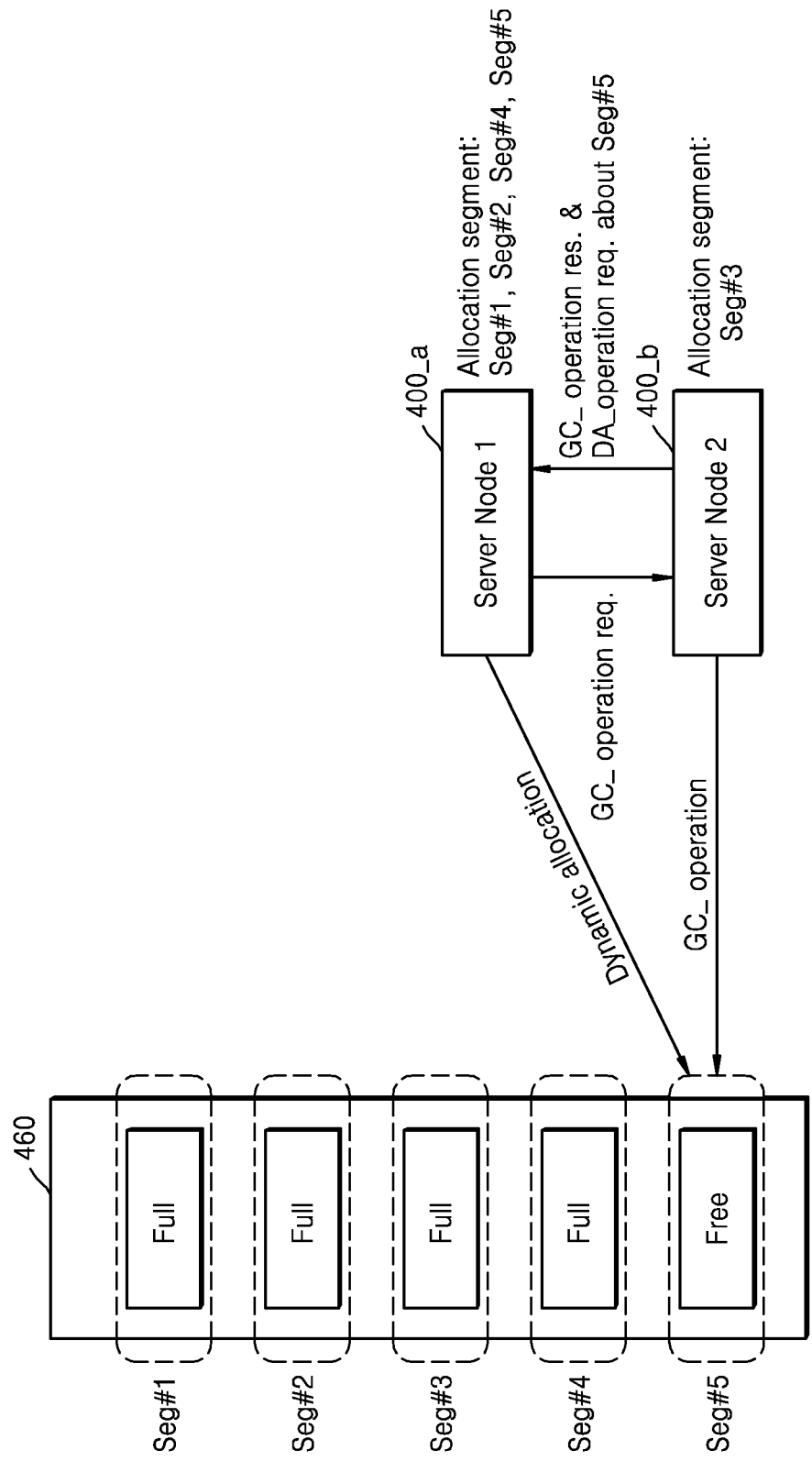
Figure 8:
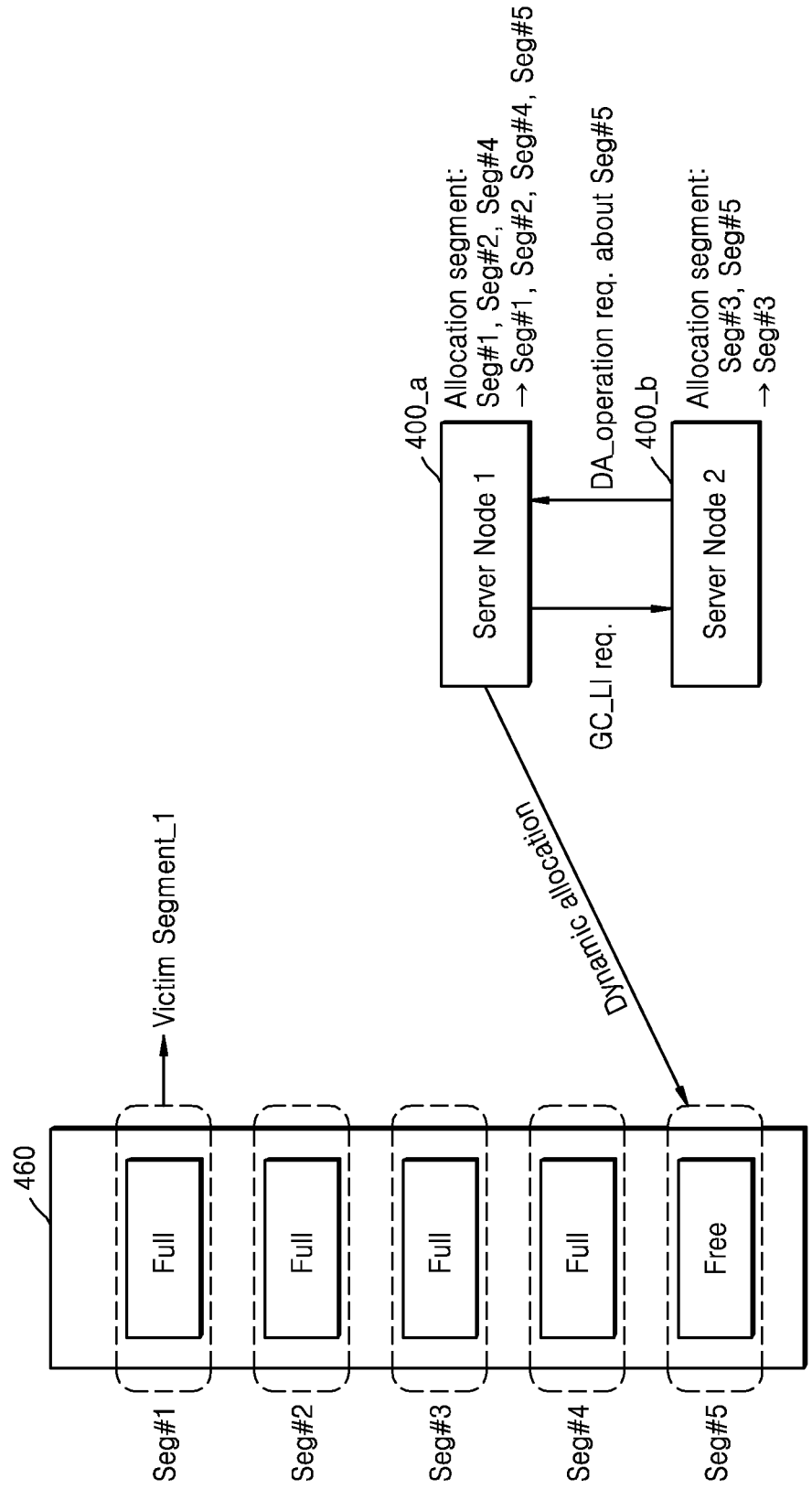

FIGS. 7A, 7B, and 8 are diagrams for describing examples of an operation of a memory system MS performing a garbage collection (GC) operation according to various embodiments of the present disclosure.

Referring to FIG. 7A, the memory system MS may include a first server node 400_a, a second server node 400_b, and a storage array 460. The storage array 460 may include first to fifth segments Seg#1 to Seg#5 having data stored therein. The first segment Seg#1, the second segment Seg#2, and the fourth segment Seg#4 may have been allocated to the first server node 400_a, and the third segment Seg#3 and the fifth segment Seg#5 may have been allocated to the second sever node 400_b. Segments that have been allocated (e.g., allocation segments) and contain data are labeled in FIG. 7A as "full."

Before performing the GC operation in order to generate a free segment, the first server node 400_a may provide a GC load information request signal GC_LI req. to the second server node 400_b. In response to the signal, the second server node 400_b may provide GC load information GC_LI of the second server node 400_b to the first server node 400_a. As described above, the GC load information GC_LI may include at least one of garbage collection costs and CPU/memory utilization of the second server node 400_b. In an embodiment, the first server node 400_a may receive from the second server node 400_b a garbage collection cost regarding the fifth segment Seg#5, which is selected as a second victim segment Victim Segment_2, and may compare garbage collection cost regarding the first segment Seg#1, which is selected as a first victim segment Victim Segment_1, with the garbage collection cost regarding the fifth segment Seg#5 selected as the second victim segment Victim Segment_2. The garbage collection costs may be calculated based on the number of items of valid page data of each of the victim segments Victim Segment_1 and Victim Segment_2. In example embodiments, the garbage collection cost of a victim segment having a relatively larger number of items of valid page data may be higher than the garbage collection cost of a victim segment having a relatively smaller number of items of valid page data. In another embodiment, the first server node 400_a may receive information obtained by converting the CPU/memory utilization regarding the second server node 400_b into a predetermined common level unit, and may compare the information with information obtained by converting CPU/memory utilization regarding the first server node 400_a into a predetermined common level unit.

Referring to FIG. 7B, the first server node 400_a may compare GC load information of the first server node 400_a with GC load information of the second server node 400_b and may perform, based on a comparison result, a load balancing operation in which a GC operation request signal GC_operation req. is provided to the second server node 400_b from the first server node 400_a. For example, when a load of the first server node 400_a when performing the GC operation is greater than that of the second server node 400_b, the first server node 400_a may transmit the GC operation request signal GC_operation req. to the second server node 400_b, thereby allowing the second server node 400_b instead of the first server node 400_a to secure a free segment. The second server node 400_b may make a fifth segment Seg#5 selected as a second victim segment into a free segment by performing a GC operation GC_operation. When the second server node 400_b completes the GC operation GC_operation, the second server node 400_b may provide a GC operation completion signal GC_operation res. and a segment dynamic allocation operation request DA_operation req. regarding the fifth segment Seg#5 to the first server node 400_a. At the same time, the second server node 400_b may disable allocation of the fifth segment Seg#5 and may change segment allocating information of the second server node 400_b. In response to the segment dynamic allocation operation request DA_operation req., the first server node 400_a may dynamically allocate the fifth segment Seg#5 as its segment, and may secure a free segment for a future memory operation by changing segment allocating information of the first server node 400_a from "Full" to "Free".

Referring to FIG. 8, before performing the GC operation, the first server node 400_a may provide a GC load information request signal GC_LI req. to the second server node 400_b. In this regard, when there is a free segment from among segments Seg#3 and Seg#5 allocated to the second server node 400_b, the second server node 400_b may provide a segment dynamic allocation operation request DA_operation req. regarding the free segment to the first server node 400_a. For example, since a fifth segment Seg#5 allocated to the second server node 400_b is a free segment, the second server node 400_b may provide the segment dynamic allocation operation request DA_operation req. regarding the fifth segment Seg#5 to the first server node 400_a without performing a separate GC collection operation. In response to the segment dynamic allocation operation request DA_operation req., the first server node 400_*a* may dynamically allocate the fifth segment Seg#5 as its segment, thereby securing a free segment for a future memory operation. Since descriptions made with reference to FIGS. 7A, 7B, and 8 merely relate to example embodiments, the spirit of the present disclosure may be applied to a memory system including a plurality of server nodes, as well.

Figure 9:
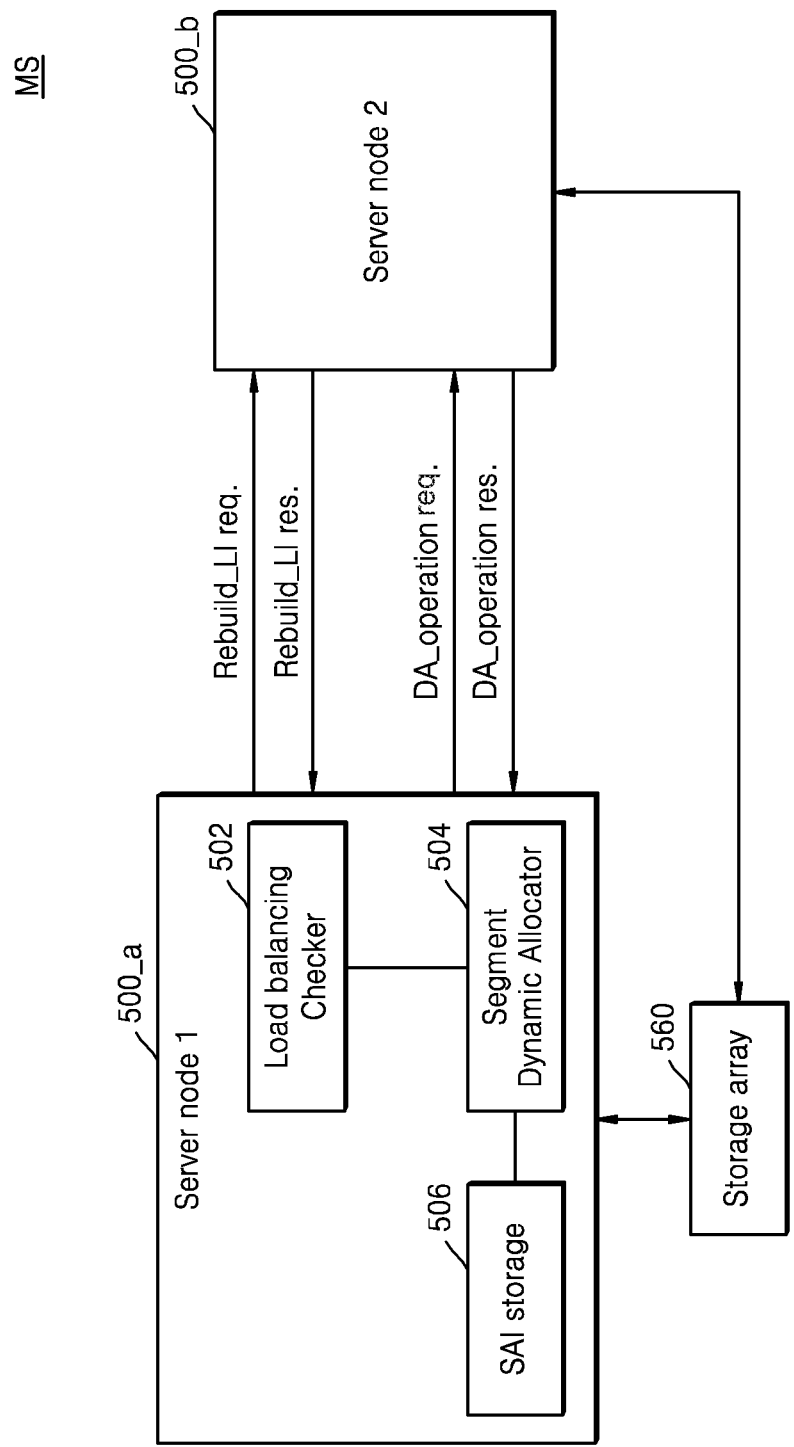
FIG. 9 is a diagram for describing, in detail, an operation of a memory system in times of performing a redundant array of inexpensive disks (RAID) rebuild operation according to an exemplary embodiment of the present disclosure.

FIG. 9 is a diagram for describing, in detail, an operation of a memory system MS in times of performing a redundant array of inexpensive disks (RAID) rebuild operation according to an example embodiment of the present disclosure.

Referring to FIG. 9, the memory system MS may include a first server node 500_*a*, a second server node 500_*b*, and a storage array 560. The memory system MS may support a RAID. The first server node 500_*a* may include a load balancing checker 502, a segment dynamic allocator 504, and an SAI storage 506 and, although not illustrated, the second server node 500_*b* may also include the same configurations. After receiving report on a disable state of some memory devices from the storage array 560, the first server node 500_*a* may perform the RAID rebuild operation as a part of a background operation. In an embodiment, before the first server node 500_*a* performs the RAID rebuild operation, the load balancing checker 502 may provide a rebuild load information request signal Rebuild_LI req. to the second server node 500_*b*, requesting rebuild load information for the second server node 500_*b*. Rebuild load information may include information about CPU/memory utilization regarding the second server node 500_*b*. The rebuild load information request signal Rebuild_LI req. may be received by a load balancing checker of the second server node 500_*b*, and the load balancing checker of the second server node 500_*b* may send a rebuild load information response signal Rebuild_LI res. The load balancing checker 502 may receive the rebuild load information response signal Rebuild_LI res. including the rebuild load information from the second server node 500_*b*.

The load balancing checker 502 may compare rebuild load information of the first server node 500_*a* with rebuild load information of the second server node 500_*b*, and the load balancing checker 502 perform a load balancing operation based on a comparison result. For example, when a difference between the rebuild load information of the first server node 500_*a* and the rebuild load information of the second server node 500_*b* is greater than a threshold value, the load balancing checker 502 may allocate some of segments allocated to the first server node 500_*a* to the second server node 500_*b*, thereby allowing the second server node 500_*b* instead of the first server node 500_*a* to perform a RAID rebuild operation regarding dynamically allocated segments. The load balancing checker 502 may select a target segment to be allocated from the first server node 500_*a* to the second server node 500_*b*. The segment dynamic allocator 504 may change segment allocating information of the first server node 500_*a* by performing a segment dynamic allocation operation matching the load balancing operation. Also, the segment dynamic allocator 504 may provide a segment dynamic allocation operation request signal DA_operation req. matching the load balancing operation and changed segment allocating information of the first server node 500_*a* to the second server node 500_*b*. In response to the segment dynamic allocation operation request signal DA_operation req., the second server node 500_*b* may perform a dynamic allocation operation and may provide a segment dynamic allocation operation completion signal DA_operation res. to the first server node 500_*a*. As described above, the first server node 500_*a* and the second server node 500_*b* may perform a RAID rebuild operation regarding segments having allocation dynamically changed and thus may manage the storage array 560.

Figure 10:
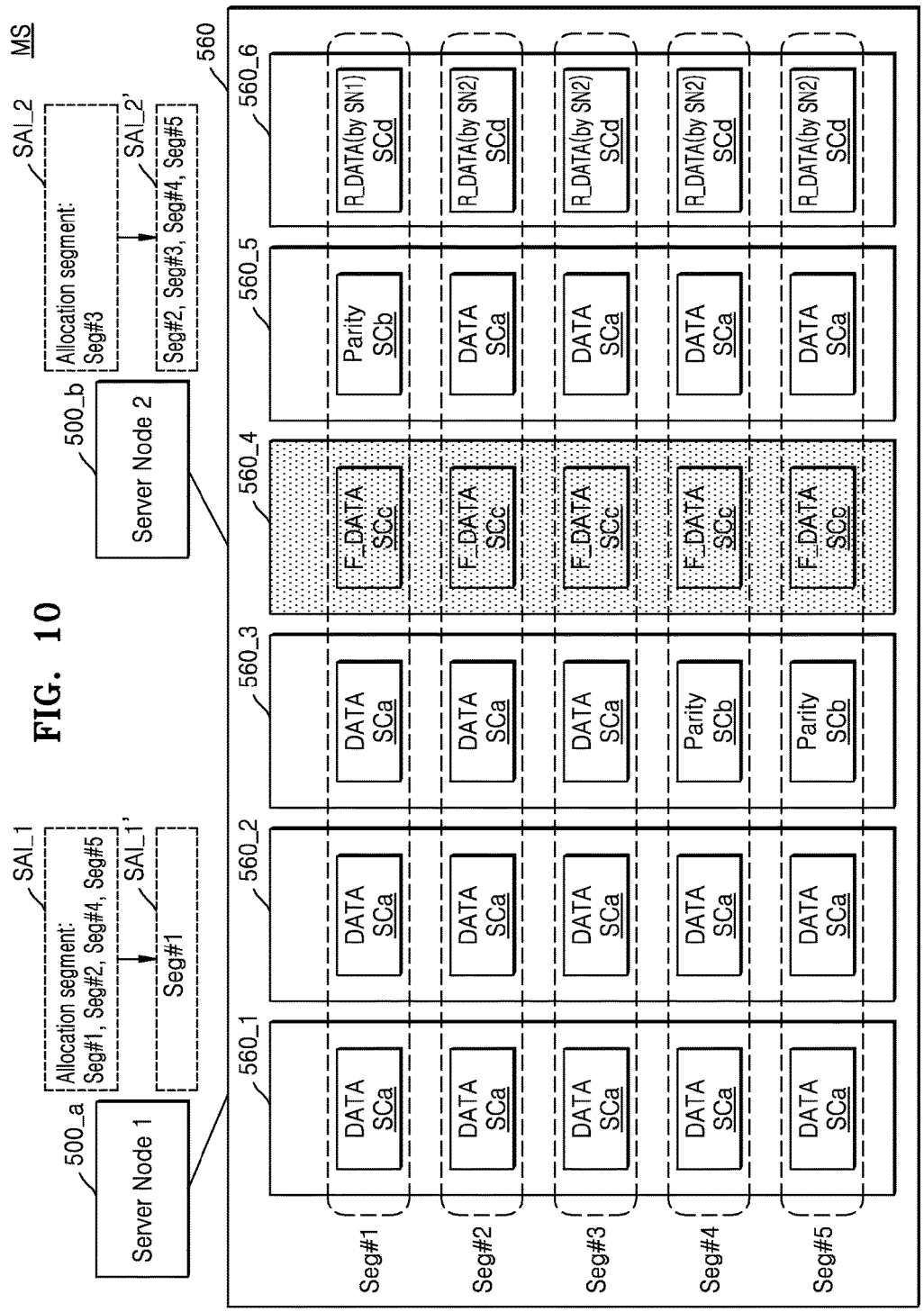
FIG. 10 is a diagram for describing an example of an operation of a memory system in times of performing a RAID rebuild operation according to an exemplary embodiment of the present disclosure.

FIG. 10 is a diagram for describing an example of an operation of a memory system MS in times of performing a RAID rebuild operation according to an exemplary embodiment of the present disclosure.

Referring to FIG. 10, the memory system MS may include a first server node 500_*a*, a second server node 500_*b*, and a storage array 560. The storage array 560 may include first to sixth memory devices 560_1 to 560_6, and the sixth memory device 560_6 may be a spare memory device for the RAID rebuild operation. Hereinafter in this example, the fourth memory device 560_4 is assumed to have an error and thus be in a disable state. Also, a first segment Seg#1, a second segment Seg#2, a fourth segment Seg#4, and a fifth segment Seg#5 are allocated to the first server node 500_*a*, and a third segment Seg#3 is allocated to the second server node 500_*b*, and thus, the first server node 500_*a* and the second server node 500_*b* may share the storage array 560. Each of the segments Seg#1 to Seg#5 may include segment chunks SCa having data DATA stored therein and a segment chunk SCb having RAID parity Parity stored therein. Each of the segments Seg#1 to Seg#5 may correspond to a RAID stripe and may be a memory unit of the RAID rebuild operation.

When fail data F_DATA stored in a segment chunk SCc of the fourth memory device 560_4 cannot be read normally (because, for example, the fourth memory device 560_4 is in a disable state), the first server node 500_*a* may perform a RAID rebuild operation using the data DATA and the RAID parity Parity stored in the other segment chunks SCa and SCb constituting segments. The first server node 500_*a* may request rebuild load information to the second server node 500_*b* before performing the RAID rebuild operation and thus may receive rebuild load information of the second server node 500_*b*. The first server node 500_*a* may compare its rebuild load information with the rebuild load information of the second server node 500_*b* and, when a comparison result is greater than a threshold value, the first server node 500_*a* may perform a load balancing operation, thereby allowing the second server node 500_*b* to instead perform a RAID rebuild operation regarding some of segments allocated to the first server node 500_*a*.

For example, as a result of performing the load balancing operation, the first server node 500_*a* may select the second segment Seg#2, the fourth segment Seg#4, and the fifth segment Seg#5 allocated to the first server node 500_*a* as target segments, and allow the second server node 500_*b* to perform a RAID rebuild operation regarding the target segments. The first server node 500_*a* may change first segment allocating information SAI_1 of the first server node 500_*a* by performing a segment dynamic allocation operation matching the load balancing operation. The first server node 500_*a* may request the second server node 500_*b* to perform a segment dynamic allocation operation matching the load balancing operation. In response to the request, the second server node 500_*b* may change second segment allocating information SAI_2 of the second server node 500_*b*.

Based on changed first segment allocating information SAI_1', the first server node 500_*a* may perform a RAID rebuild operation regarding the first segment Seg#1. For example, the first server node 500_*a* may generate restoration data R_DATA based on a logic operation using the data DATA and the RAID parity Parity of the first segment Seg#1 and thus may store the restoration data R_DATA in a segment chunk included in the first segment Seg#1 from among segment chunks SCd of the sixth memory device 560_6.

Based on changed second segment allocating information SAI_2', the second server node 500_b may perform a RAID rebuild operation regarding the second to fifth segments Seg#2 to Seg#5. Since descriptions made with reference to FIG. 10 merely relate to an example embodiment, the spirit of the present disclosure may be applied to a memory system including a plurality of server nodes, as well.

Figure 11:
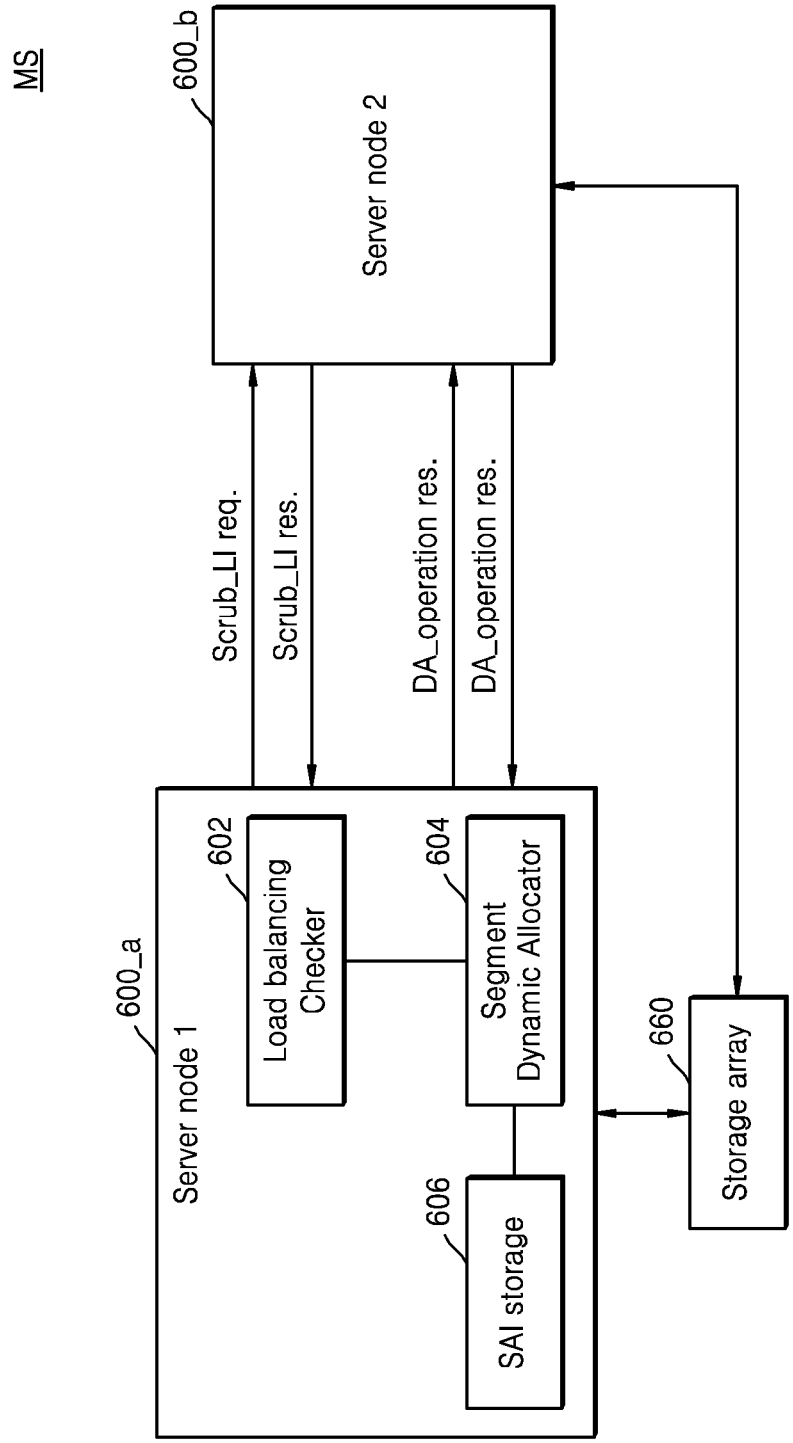
FIG. 11 is a diagram for describing, in detail, an operation of a memory system in times of performing a RAID scrubbing operation according to an exemplary embodiment of the present disclosure.

FIG. 11 is a diagram for describing, in detail, an operation of a memory system MS in times of performing a RAID scrubbing operation according to an example embodiment of the present disclosure.

Referring to FIG. 11, the memory system MS may include a first server node 600_a, a second server node 600_b, and a storage array 660. The memory system MS may support a RAID. The first server node 600_a may include a load balancing checker 602, a segment dynamic allocator 604, and an SAI storage 606, and, although not illustrated, the second server node 600_b may also include the same configurations. The first server node 600_a may perform the RAID scrubbing operation as a part of a background operation. In an embodiment, before the first server node 600_a performs the RAID scrubbing operation, the load balancing checker 602 may provide a scrubbing load information request signal Scrub_LI req. to the second server node 600_b, requesting scrubbing load information from the second server node 600_b. Scrubbing load information may include information about CPU/memory utilization regarding the second server node 600_b. The scrubbing load information request signal Scrub_LI req. may be received by a load balancing checker of the second server node 600_b, and the load balancing checker of the second server node 600_b may send a scrubbing load information response signal Scrub_LI res. The load balancing checker 602 may receive the scrubbing load information response signal Scrub_LI res. including the scrubbing load information from the second server node 600_b.

The load balancing checker 602 may compare scrubbing load information of the first server node 600_a with scrubbing load information of the second server node 600_b and the load balancing checker 602 may perform, based on a comparison result, a load balancing operation in which a target segment to be allocated from the first server node 600_a to the second server node 600_b is selected. The segment dynamic allocator 604 may change segment allocating information of the first server node 600_a by performing a segment dynamic allocation operation matching the load balancing operation. Also, the segment dynamic allocator 604 may provide a segment dynamic allocation operation request signal DA_operation req. matching the load balancing operation and changed segment allocating information of the first server node 600_a to the second server node 600_b. In response to the segment dynamic allocation operation request signal DA_operation req., the second server node 600_b may perform a dynamic allocation operation and may provide a segment dynamic allocation operation completion signal DA_operation res to the first server node 600_a. As described above, the first server node 600_a and the second server node 600_b may perform a RAID scrubbing operation regarding segments having allocation dynamically changed and thus may manage the storage array 660.

Figure 12:
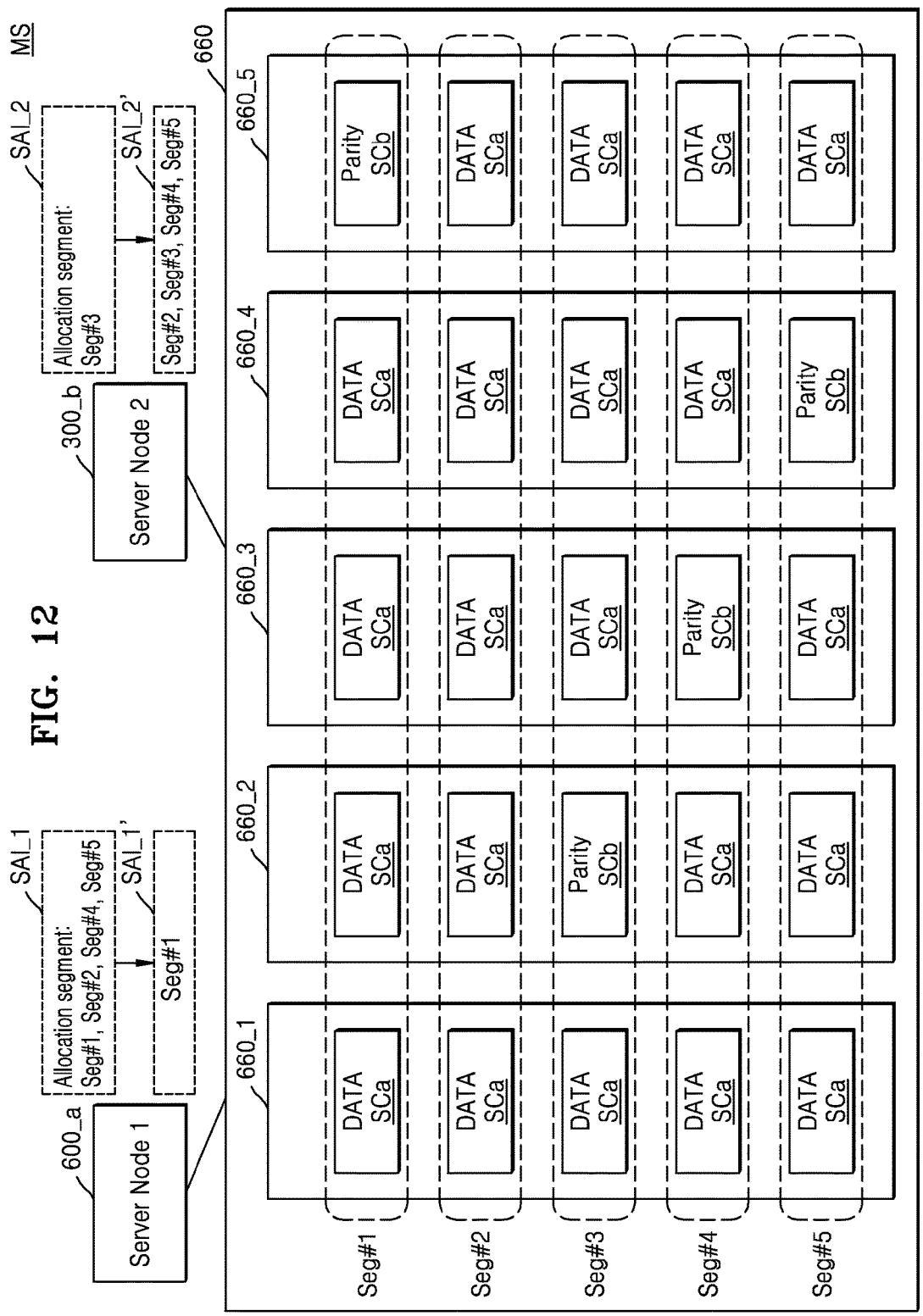
FIG. 12 is a diagram for describing an example of an operation of a memory system in times of performing a RAID scrubbing operation according to an exemplary embodiment of the present disclosure.

FIG. 12 is a diagram for describing an example of an operation of a memory system MS in times of performing a RAID scrubbing operation according to an example embodiment of the present disclosure.

Referring to FIG. 12, the memory system MS may include a first server node 600_a, a second server node 600_b, and a storage array 660. The storage array 660 may include first to fifth memory devices 660_1 to 660_5. A first segment Seg#1, a second segment Seg#2, a fourth segment Seg#4, and a fifth segment Seg#5 are allocated to the first server node 600_a, and a third segment Seg#3 is allocated to the second server node 600_b, and thus, the first server node 600_a and the second server node 600_b may share the storage array 660.

Each of the segments Seg#1 to Seg#5 may include segment chunks SCa having data DATA stored therein and a segment chunk SCb having RAID parity Parity stored therein. Each of the segments Seg#1 to Seg#5 may correspond to a RAID stripe and may be a memory unit of the RAID scrubbing operation.

The first server node 600_a may perform the RAID scrubbing operation by using data DATA and RAID parity Parity constituting segments. The RAID scrubbing operation may define an operation of checking matches of current RAID parity Parity based on a logic operation using the data DATA and the RAID parity Parity.

The first server node 600_a may request scrubbing load information from the second server node 600_b before performing the RAID scrubbing operation and thus may receive scrubbing load information of the second server node 600_b. The first server node 600_a may compare its scrubbing load information with the scrubbing load information of the second server node 600_b and, when a comparison result is greater than a threshold value, may perform a load balancing operation, thereby allowing the second server node 600_b to instead perform a RAID scrubbing operation regarding some of the segments allocated to the first server node 600_a.

For example, as a result of performing the load balancing operation, the first server node 600_a may select the second segment Seg#2, the fourth segment Seg#4, and the fifth segment Seg#5 allocated to the first server node 600_a as target segments, and allow the second server node 600_b to perform a RAID scrubbing operation regarding the target segments. The first server node 600_a may change first segment allocating information SAI_1 of the first server node 600_a by performing a segment dynamic allocation operation matching the load balancing operation. The first server node 600_a may request the second server node 600_b to perform a segment dynamic allocation operation matching the load balancing operation. In response to the request, the second server node 600_b may change second segment allocating information SAI_2 of the second server node 600_b.

Based on changed first segment allocating information SAI_1', the first server node 600_a may perform a RAID scrubbing operation regarding the first segment Seg#1. Based on changed second segment allocating information SAI_2', the second server node 600_b may perform a RAID scrubbing operation regarding the second to fifth segments Seg#2 to Seg#5. Since descriptions made with reference to FIG. 12 merely relate to an example embodiment, the spirit of the present disclosure may be applied to a memory system including a plurality of server nodes, as well.

Figure 13:
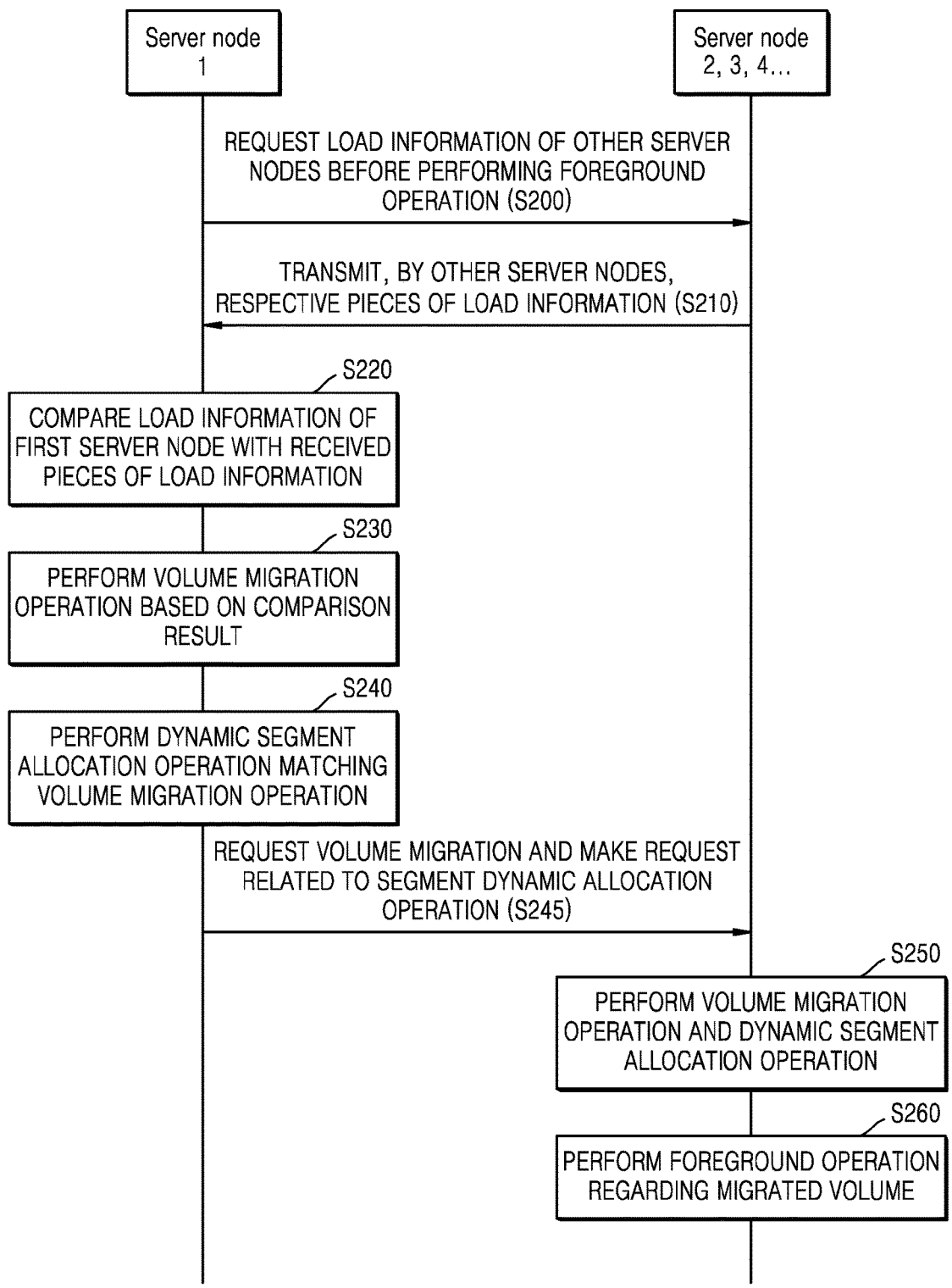
FIG. 13 is a flowchart of an operating method of a memory system, according to another exemplary embodiment of the present disclosure.

FIG. 13 is a flowchart of an operating method of a memory system, according to another example embodiment of the present disclosure.

Referring to FIG. 13, in operation S200, a first server node Server node1 may send a request for load information to other server nodes Server node2, 3, 4, . . . before the first server node Server node1 performs a foreground operation. In operation S210, in response to the load information request received from the first server node Server node1, the other server nodes Server node2, 3, 4, . . . may transmit respective pieces of load information to the first server node Server node1. In operation S220, the first server node Server node1 may compare load information of the first server node Server node1 with each of the received pieces of load information. For example, the first server node Server node1 may compare load information of the first server node Server node1 with load information of the second server node Server node2, compare load information of the first server node Server node1 with load information of the third server node Server node3, compare load information of the first server node Server node1 with load information of the third server node Server node3, etc. In operation S230, the first server node Server node1 may perform a volume migration operation based on a comparison result. For example, when a difference between the load information of the first server node Server node1 and load information of the second server node Server node2 is greater than a threshold value, at least one target volume may be selected from among volumes allocated to the first server node Server node1, and may be migrated to the second sever node Server node2. In operation S240, the first server node Server node1 may perform a dynamic segment allocation operation corresponding to the volume migration operation. The operation S240 may include operation S245 in which the first server node Server node1 provides a volume migration request and a request related to a segment dynamic allocation operation to the other server nodes Server node2, 3, 4, . . . . In operation S250, in response to the request, the other server nodes Server node2, 3, 4, . . . may perform a volume migration operation regarding a target volume and a dynamic segment allocation operation regarding segments included in the target volume. In operation S260, the other server nodes Server node2, 3, 4, . . . may perform a foreground operation regarding the migrated volume.

As described above, even in a foreground operation in which a memory operation is performed by receiving a memory operation request from a host, load degrees of server nodes are compared with each other, a target volume allocated to one server node is migrated to the other server node, based on a comparison result, and then, a foreground operation regarding the target volume is performed by the other server node. Thus, the memory operation may be performed considering a load degree of each server node, and accordingly, operation performance of a memory system may be improved.

Figure 14A:
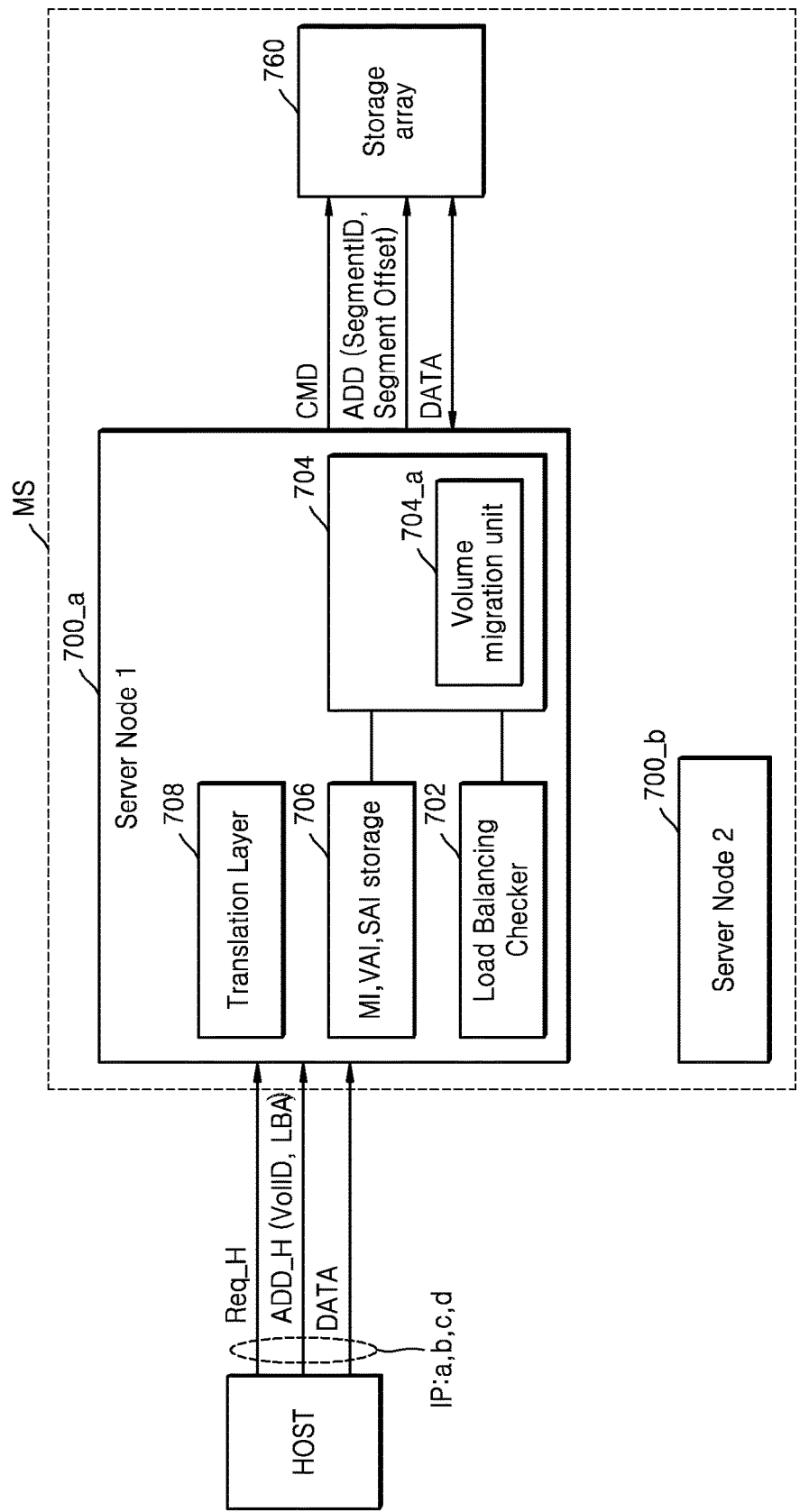
FIGS. 14A and 14B are diagrams for describing an exemplary operating method of a memory system in times of performing a foreground operation.
Figure 14B:
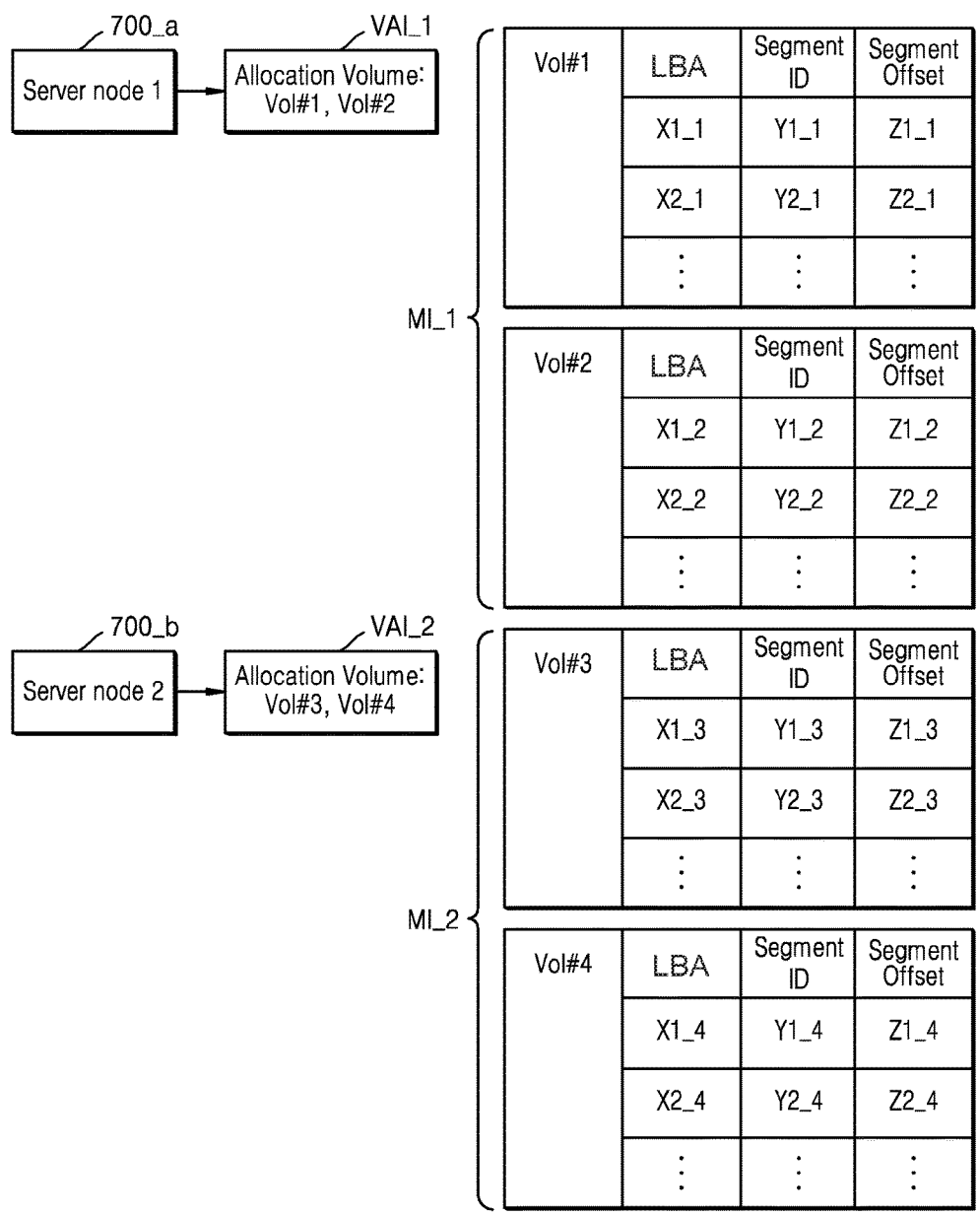

FIGS. 14A and 14B are diagrams for describing an example operating method of a memory system MS in times of performing a foreground operation.

Referring to FIG. 14A, the memory system MS may include a first server node 700_a, a second server node 700_b, and a storage array 760. In an embodiment, a host HOST may be networked with the first server node 700_a via an IP address a,b,c,d, and may provide a memory operation request Req_H, a logic address ADD_H, and data DATA to the first server node 700_a. Although not illustrated in FIG. 14A, the host HOST may be networked with the second server node 700_b via an IP address different from that used to network the host HOST with the first server node 700_a, and may provide the memory operation request Req_H, the logic address ADD_H, and the data DATA to the second server node 700_b. The first server node 700_a may include a load balancing checker 702, a segment dynamic allocator 704, an information storage for storing volume allocating information VAI, mapping information MI, and segment allocating information SAI 706, and a translation layer 708. Also, the segment dynamic allocator 704 may include a volume migration unit 704_a. The second server node 700_b may also have the same configurations as those of the first server node 700_a.

The translation layer 708 may convert the logic address ADD_H referring to a volume ID VolID and a logic block address LBA into an address ADD referring to a segment ID SegmentID and a segment offset Segment Offset, and may generate the mapping information MI indicating mapping relationship between the logic address ADD_H and the address ADD. The first server node 700_a may perform a memory operation by providing a command CMD corresponding to the memory operation request Req_H, the address ADD, and the data DATA to the storage array 760.

Further referring to FIG. 14B, a first volume Vol#1 and a second volume Vol#2 have been allocated to the first server node 700_a, and first volume allocating information VAI_1 indicating the allocation state may be stored in the information storage 706. For example, the first volume allocating information VAI_1 indicating the allocation state may identify the first volume Vol#1 and the second volume Vol#2 as having been allocated to the first server node 700_a. A third volume Vol#3 and a fourth volume Vol#4 have been allocated to the second server node 700_b, and second volume allocating information VAI_2 indicating the allocation state may be stored in an information storage (not shown) of the second server node 700_b. For example, the second volume allocating information VAI_2 indicating the allocation state may identify the third volume Vol#3 and the fourth volume Vol#4 as having been allocated to the second server node 700_b. The translation layer 708 may generate mapping information with respect to volumes. For example, the translation layer 708 may generate mapping information MI_1 regarding the first volume Vol#1 and the second volume Vol#2 allocated to the first server node 700_a. A translation layer (not shown) of the second server node 700_b may generate mapping information MI_2 regarding the third volume Vol#3 and the fourth volume Vol#4 allocated to the second server node 700_b. As shown in FIG. 14B, each volume may include a plurality of segments.

In example embodiments, the mapping information MI_1 regarding the volume ID VolID of the first volume Vol#1 and the volume ID VolID of the second volume Vol#2 may identify a plurality of logic block addresses (LBA) for Vol#1 (X1_1, X2_1, etc.) and a plurality of LBAs for Vol#2 (X1_2, X2_2, etc.). And, for each LBA, the mapping information MI_1 may include a corresponding segment ID (e.g., Y1_1, Y2_1, Y1_2, Y2_2, etc.) and a segment Offset (e.g., Z1_1, Z2_1, Z1_2, Z2_2, etc.). Similarly, the mapping information MI_2 regarding the volume ID VolID of the third volume Vol#3 and the volume ID VolID of the fourth volume Vol#4 may identify a plurality of LBAs for Vol#3 (X1_3, X2_3, etc.) and a plurality of LBAs for Vol#4 (X1_4, X2_4, etc.). And, for each LBA, the mapping information MI_2 may include a corresponding segment ID (e.g., Y1_3, Y2_3, Y1_4, Y2_4, etc.) and segment Offset (e.g., Z1_3, Z2_3, Z1_4, Z2_4, etc.).

The first server node 700_a and the second server node 700_b may perform a memory operation by referring to the mapping information MI_1 and MI_2.

Figure 15A:
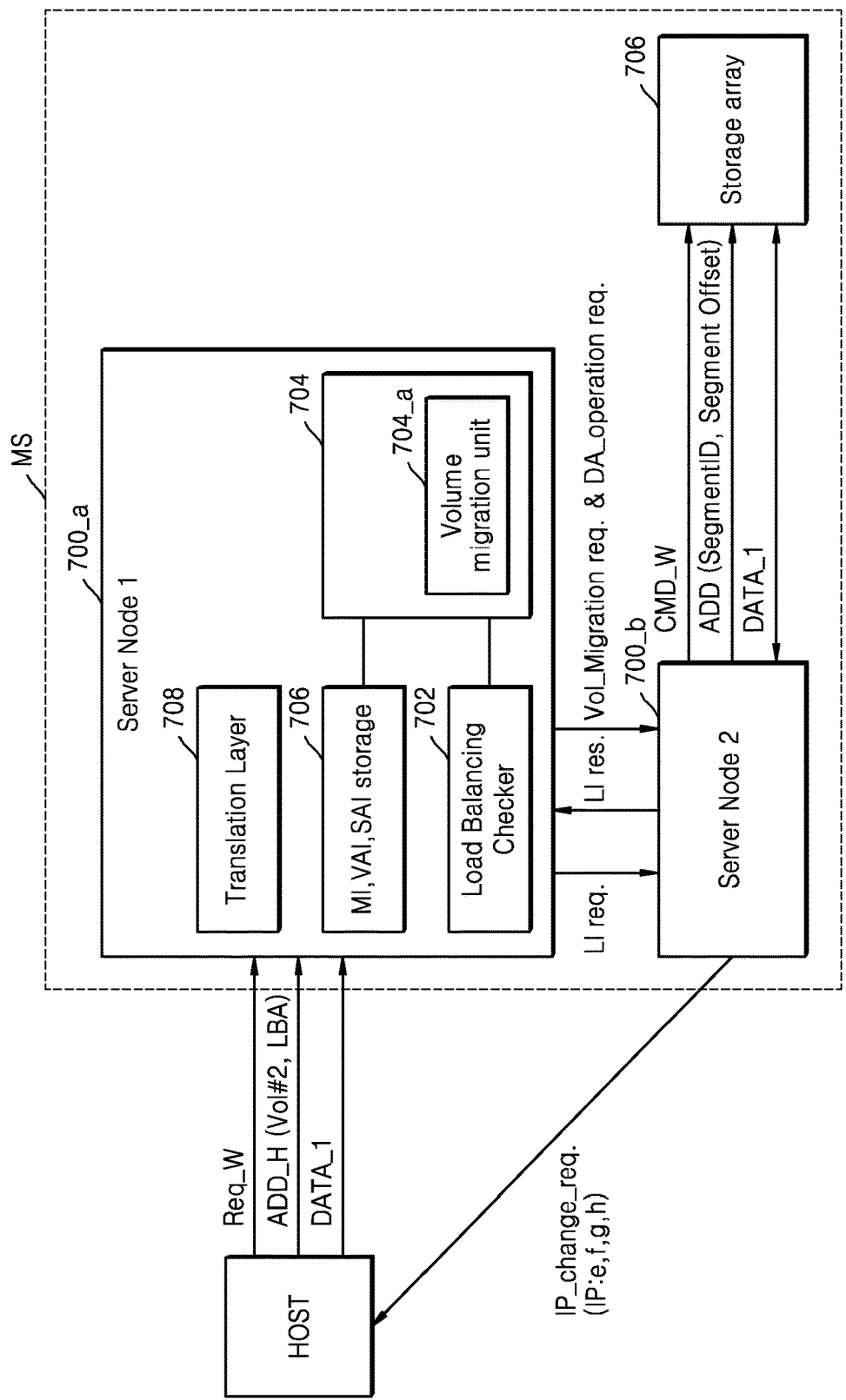
FIGS. 15A and 15B are diagrams for describing an operating method of a memory system in times of performing a foreground operation according to an exemplary embodiment of the present disclosure.
Figure 15B:
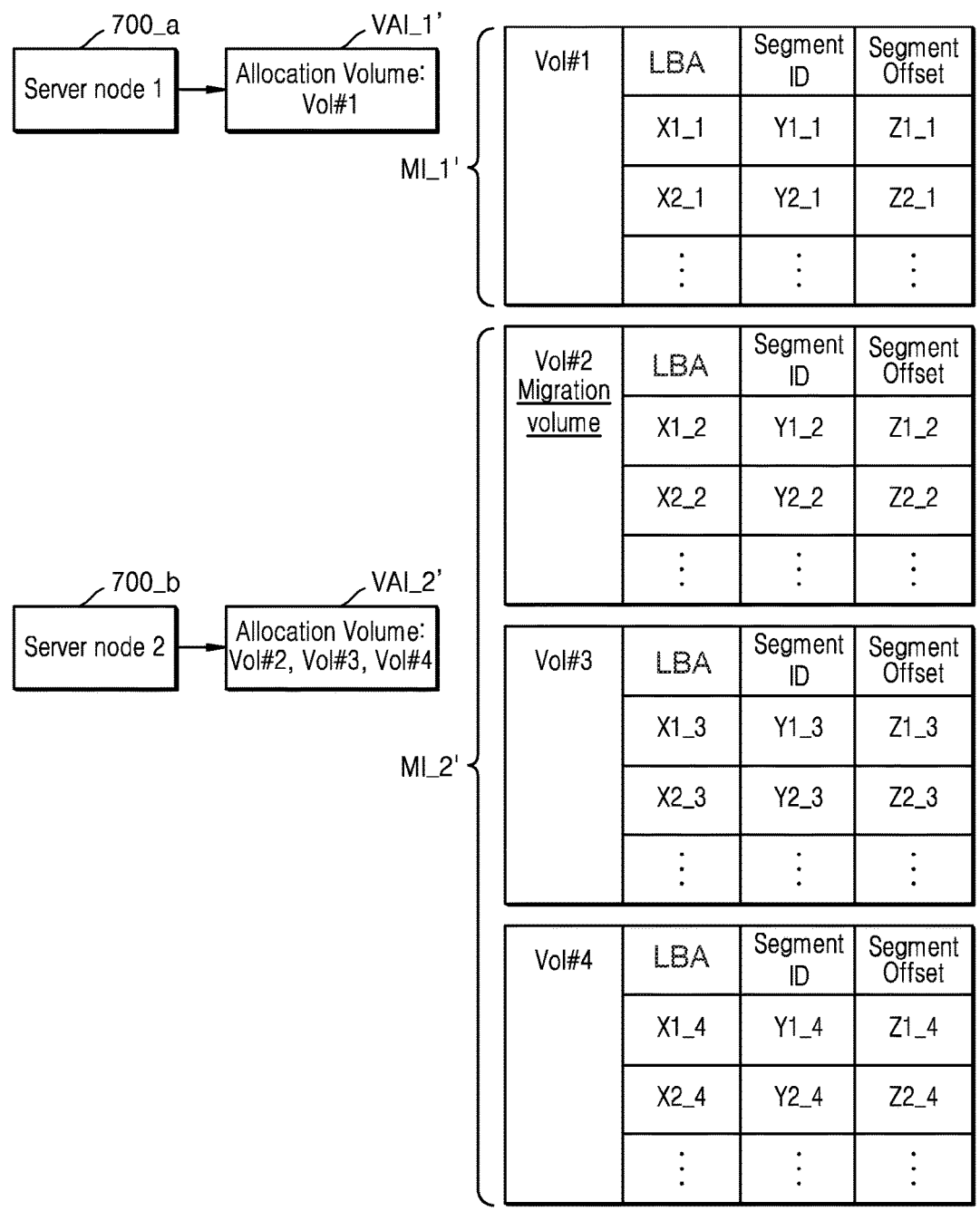

FIGS. 15A and 15B are diagrams for describing an operating method of a memory system MS in times of performing a foreground operation according to an embodiment of the present disclosure.

Referring to FIG. 15A, a first server node 700_a may receive a write operation request Req_W, a logic address ADD_H indicating a second volume Vol#2 and a logic block address LBA, and first data DATA_1 from a host HOST. Before performing a write operation in response to the write operation request Req_W, a load balancing checker 702 may provide a load information request signal LI req. to a second server node 700_b. The second server node 700_b may send to the load balancing checker 702 of the first server node 700_a a load information response signal LI res., including load information of the second server node 700_b. The load balancing checker 702 of the first server node 700_a may compare received load information of the second server node 700_b with load information of the first server node 700_a, and based on a comparison result, a volume migration unit 704_a of a segment dynamic allocator 704, may select a target volume from among volumes Vol#1 and Vol#2 allocated to the first server node 700_a and perform a migration operation.

The volume migration unit 704_a may change volume allocating information of the first server node 700_a by performing the migration operation, and a segment dynamic allocator 704 may change segment allocating information of the first server node 700_a by performing a segment dynamic allocation operation regarding a plurality of segments included in the target volume. Hereinafter, it is assumed that the target volume is the second volume Vol#2. The segment dynamic allocator 704 may provide to the second server node 700_b a migration request signal Vol_Migration req. regarding the second volume Vol#2 and a segment dynamic allocation operation request signal DA_operation req. regarding a plurality of segments Y1_2, Y2_2, . . . included in the second volume Vol#2. In response to receiving the migration request signal Vol_Migration req. regarding the second volume Vol#2 and the segment dynamic allocation operation request signal DA_operation req. regarding a plurality of segments Y1_2, Y2_2, . . . , the second server node 700_b may allocate the second volume Vol#2 as its volume and may allocate the plurality of segments Y1_2, Y2_2, . . . included in the second volume Vol#2 as its segment.

Instead of the first server node 700_a, the second server node 700_b may perform the write operation in response to the write operation request Req_W received from the host HOST. Also, in the future, when a memory operation regarding the second volume Vol#2 is requested, an IP address e,f,g,h regarding the second server node 700_b and an IP change request IP_change_req. may be provided to the host HOST so that the host HOST may be directly networked with the second server node 700_b. However, this is just an example embodiment. Accordingly, the present disclosure is not limited thereto, and the spirit of the present disclosure may include all the embodiments in which when a memory operation regarding the second volume Vol#2 is requested, the host HOST may be directly networked with the second server node 700_b.

Further referring to FIG. 15B, compared to FIG. 14B, the first server node 700_a may perform a migration operation regarding the second volume Vol#2 and may change first volume allocating information VAI_1' so as to indicate that only the first volume Vol#1 has been allocated to the first server node 700_a. Also, the second server node 700_b may perform a migration operation regarding the second volume Vol#2 and may change second volume allocating information VAI_2' so as to indicate that the second volume Vol#2, a third volume Vol#3, and a fourth volume Vol#4 have been allocated to the second server node 700_b. Also, the first server node 700_a may provide mapping information regarding the second volume Vol#2, stored in an information storage 706, to the second sever node 700_b. Accordingly, the first server node 700_a may store only mapping information MI_1' regarding the first volume Vol#1 in the information storage 706. The second server node 700_b may receive the mapping information regarding the second volume Vol#2 from the first server node 700_a and may store mapping information MI_2' regarding the second volume Vol#2, the third volume Vol#3, and the fourth volume Vol#4 in an information storage of the second server node 700_b. Instead of the first server node 700_a, the second server node 700_b may perform a memory operation regarding the second volume Vol#2, requested from the host HOST, by using the mapping information MI_2'.

While the inventive concept has been particularly shown and described with reference to embodiments thereof, it will be understood that various changes in form and details may be made therein without departing from the spirit and scope of the following claims.

What is claimed is:

1. An operating method of a memory system comprising a storage array comprising a plurality of segments and a first server node and a second server node allocating and managing the plurality of segments, the method comprising:
   requesting, by the first server node, load information of the second server node from the second server node before performing a memory operation;
   receiving, by the first server node, the load information of the second server node from the second server node;
   comparing, by the first server node, load information of the first server node with the load information of the second server node to obtain a comparison result;
   performing, by the first server node, a load balancing operation, based on the comparison result; and
   performing, by the first server node, a segment dynamic allocation operation regarding the storage array,
   wherein the segment dynamic allocation operation corresponds to the load balancing operation.

2. The method of claim 1, wherein each of the load information of the first server node and the load information of the second server node is generated by converting central processing unit (CPU)/memory utilization regarding each of the respective first and second server nodes into a predetermined common level unit.

3. The method of claim 1, wherein the performing the load balancing operation comprises:
   when a difference between the load information of the second server node and the load information of the first server node is greater than a threshold value, allocating, by the first server node, the memory operation to the second server node.

4. The method of claim 3, wherein the performing the load balancing operation further comprises:
   requesting, by the first server node, the second server node to perform the memory operation allocated to the second server node.

5. The method of claim 1, wherein the performing the segment dynamic allocation operation comprises:
   changing, by the first server node, first segment allocating information indicating at least one segment allocated to the first server node,
   wherein the first server node performs the memory operation based on the changed first segment allocating information.

6. The method of claim 5, wherein the performing the segment dynamic allocation operation further comprises:
   transmitting, by the first server node, the changed first segment allocating information to the second server node; and
   requesting the second server node to perform a second segment dynamic allocation operation regarding the second server node.

7. The method of claim 6, further comprising:
   based on the changed first segment allocating information, changing, by the second server node, second segment allocating information indicating at least one segment allocated to the second server node.

8. The method of claim 7, further comprising:
   periodically transmitting, by the first server node, the first segment allocating information to the second server node; and
   receiving, by the first server node, the second segment allocating information from the second server node.

9. The method of claim 1, wherein a unit size of each of the plurality of segments changes according to a memory operation mode of the first server node and the second server node.

10. The method of claim 1, wherein, when the memory operation is a garbage collection operation,
   the load information of the first server node comprises at least one selected from garbage collection costs regarding at least one segment allocated to the first server node and central processing unit (CPU)/memory utilization regarding the first server node, and
   the load information that the first server node requests from the second server node comprises at least one selected from garbage collection costs regarding at least one segment allocated to the second server node and CPU/memory utilization regarding the second server node.

11. The method of claim 10,
   wherein the performing the load balancing operation comprises:
      based on the comparison result, requesting, by the first server node, the second server node to perform the garbage collection operation regarding the at least one segment allocated to the second server node, and
   wherein the performing the segment dynamic allocation operation comprises:
      receiving, by the first server node, information about a free segment generated as a result of the garbage collection operation performed by the second server node; and
      performing, by the first server node, the segment dynamic allocation operation, based on the information about the free segment.

12. The method of claim 1, wherein, when the memory operation is a redundant array of inexpensive disks (RAID) rebuild operation or a RAID scrubbing operation,
   the performing the load balancing operation comprises:
      based on the comparison result, selecting, by the first server node, at least one target segment that is to be allocated to the second server node from among segments allocated to the first server node which are targets of the RAID rebuild operation or the RAID scrubbing operation, and
   the performing the segment dynamic allocation operation comprises:
      changing, by the first server node, first segment allocating information indicating a segment allocated to the first server node, by referring to the at least one target segment; and
      requesting, by the first server node, allocation regarding the at least one target segment to the second server node.

13. An operating method of a memory system comprising a storage array comprising a plurality of segments and a first server node and a second server node allocating and managing the plurality of segments in a volume migration unit, the method comprising:
   requesting, by the first server node, load information of the second server node from the second server node before performing a memory operation;
   receiving, by the first server node, the load information of the second server node;
   comparing load information of the first server node with the load information of the second server node to obtain a comparison result;
   performing, by the first server node, a volume migration operation, based on the comparison result; and
   performing, by the first server node, a segment dynamic allocation operation regarding the storage array,
   wherein the segment dynamic allocation operation corresponds to the volume migration operation.

14. The method of claim 13, wherein the performing the volume migration operation comprises:
   based on the comparison result, selecting, by the first server node, at least one target volume that is a target of migration to the second server node from among volumes allocated to the first server node.

15. The method of claim 14, wherein the performing the segment dynamic allocation operation comprises:
   changing, by the first server node, first segment allocating information indicating a segment allocated to the first server node, by referring to at least one segment included in the target volume; and
   requesting, by the first server node, allocation regarding the at least one segment included in the target volume to the second server node.

16. An operating method of a memory system comprising a storage array having a plurality of segments and a first server node and a second server node allocating and managing the plurality of segments, the method comprising:
   requesting, by the first server node, load information of the second server node before performing a memory operation;
   receiving, from the second server node, the load information of the second server node;
   comparing, by the first server node, load information of the first server node with the load information of the second server node to obtain a comparison result;
   determining, by the first server node, if a difference between a second load indicated by the load information of the second server node and a first load indicated by the load information of the first server node is greater than a threshold value based on the comparison result;
   performing, by the first server node, a load balancing operation, when the difference between the second load and the first load is greater than the threshold value; and
   performing, by the first server node, a segment dynamic allocation operation regarding the storage array,
   wherein the segment dynamic allocation operation corresponds to the load balancing operation.

17. The method of claim 16, wherein the performing the load balancing operation comprises:
  allocating, by the first server node, the memory operation to the second server node.

18. The method of claim 17, wherein the performing the load balancing operation further comprises:
  requesting, by the first server node, the second server node to perform the memory operation allocated to the second server node.

19. The method of claim 16, wherein the performing the segment dynamic allocation operation comprises:
  changing, by the first server node, first segment allocating information indicating at least one segment allocated to the first server node,
  wherein the first server node performs the memory operation based on the changed first segment allocating information.

20. The method of claim 19, wherein the performing the segment dynamic allocation operation further comprises:
  transmitting, by the first server node, the changed first segment allocating information to the second server node; and
  requesting the second server node to perform a second segment dynamic allocation operation regarding the second server node.

* * * * *